United States Patent
Kim

(10) Patent No.: US 9,564,167 B2
(45) Date of Patent: Feb. 7, 2017

(54) OPTICAL DISC APPARATUS AND CONTROL METHOD THEREOF

(71) Applicant: SAMSUNG ELECTRONICS CO., LTD., Suwon-si, Gyeonggi-do (KR)

(72) Inventor: Jae Hyun Kim, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/078,285

(22) Filed: Mar. 23, 2016

(65) Prior Publication Data

US 2016/0284376 A1   Sep. 29, 2016

(30) Foreign Application Priority Data

Mar. 26, 2015  (KR) .................. 10-2015-0042456

(51) Int. Cl.
| G11B 7/00 | (2006.01) |
| G11B 7/1392 | (2012.01) |
| G11B 19/20 | (2006.01) |
| G11B 21/02 | (2006.01) |

(52) U.S. Cl.
CPC ....... *G11B 7/13927* (2013.01); *G11B 19/2009* (2013.01); *G11B 21/02* (2013.01)

(58) Field of Classification Search
None
See application file for complete search history.

(56) References Cited

U.S. PATENT DOCUMENTS

| 4,165,495 | A | * | 8/1979 | Takahashi | G11B 20/22 330/133 |
| 5,177,725 | A | * | 1/1993 | Terashi | G11B 7/08517 369/44.27 |
| 5,548,569 | A | * | 8/1996 | Shimizume | G11B 7/08541 360/78.05 |
| 6,101,157 | A | * | 8/2000 | Bradshaw | G11B 7/08511 369/44.25 |
| 6,151,280 | A | * | 11/2000 | Naohara | G11B 7/08511 369/44.27 |
| 6,256,273 | B1 | * | 7/2001 | Matsuda | G11B 7/08511 369/44.27 |
| 6,324,134 | B1 | * | 11/2001 | Ohtachi | G11B 7/095 369/44.32 |
| 7,239,588 | B2 | * | 7/2007 | Gotoh | G01N 21/94 250/559.45 |
| 2004/0125727 | A1 | * | 7/2004 | Schmidt | G11B 19/02 369/53.37 |

(Continued)

*Primary Examiner* — Peter Vincent Agustin
(74) *Attorney, Agent, or Firm* — Nixon & Vanderhye, P.C.

(57) ABSTRACT

An optical disc apparatus is disclosed. The optical disc apparatus includes: a driver configured to rotate an optical disc having a recording surface for data; an optical pick-up configured to emit a light beam to the optical disc rotated by the driver; and at least one processor configured to operate the optical pick-up to focus the light beam emitted from the pick-up unit to perform one of recording and reproducing the data on the recording surface and track curvature of the recording surface within a preset allowable range, and to process the light beam reflected from the recording surface, the at least one the processor further configured to increase the allowable range if it is determined that the focus of the light beam cannot track the curvature of the recording surface in a section of the recording surface.

16 Claims, 18 Drawing Sheets

(56) References Cited

U.S. PATENT DOCUMENTS

| | | | |
|---|---|---|---|
| 2007/0014209 A1* | 1/2007 | Lee | G11B 7/0948 |
| | | | 369/44.29 |
| 2010/0039913 A1 | 2/2010 | Chan | |
| 2011/0235482 A1* | 9/2011 | Kanatake | G11B 7/0945 |
| | | | 369/44.32 |
| 2016/0284376 A1* | 9/2016 | Kim | G11B 7/13927 |

* cited by examiner

OPTICAL DISC APPARATUS AND CONTROL METHOD THEREOF

CROSS-REFERENCE TO RELATED APPLICATION

This application is based on and claims priority under 35 U.S.C. §119 to Korean Patent Application No. 10-2015-0042456 filed on Mar. 26, 2015 in the Korean Intellectual Property Office, the disclosure of which is incorporated by reference herein in its entirety.

BACKGROUND

Field

Apparatuses and methods disclosed herein relate generally to an optical disc apparatus capable of reading data from an optical disc in which the data is recorded and recording data in an optical disc in which no data is recorded, and a control method thereof, and for example, to an optical disc apparatus and a control method thereof, in which an optical pick-up unit for picking up data on an optical disc is improved in servo control by forming an optical spot on an optical disc.

Description of Related Art

An image processing apparatus processes an image signal/video data received from the exterior in accordance with various video processing processes. The image processing apparatus may display an image based on the processed video data on its own display panel, or output the processed image signal to another display apparatus provided with a panel so that on the corresponding display apparatus can display an image based on the processed image signal. That is, the image processing apparatus may include the panel capable of displaying an image or include no panel as long as it can process the video data. For example, the former may include a television (TV), and the latter may include a set-top box and an optical disc apparatus. The optical disc apparatus refers to all electronic apparatuses that reproduces an optical disc in which data is recorded or writes predetermined data in the optical disc in which no data is recorded.

Among the image processing apparatuses, the optical disc apparatus picks up image data from a rotating optical disc, and processes the picked-up image data to be displayable as an image. The optical disc apparatus serves as the display apparatus to display an image by itself, or outputs the processed image data to a locally connected external display apparatus.

To pick up image data from the optical disc, a contactless optical head focuses an optical spot on a recording surface of the optical disc and receives light reflected from the recording surface. Therefore, the optical head applies various servo control including mechanical driving control along the recording surface of the optical disc.

By the way, the optical disc is manufactured by various manufacturers, and the recording surface of the optical disc may have various kinds of abnormal situations, for example, a defect, a vertical deviation and a partial vertical deviation, which disturb pickup of data. To pick up data from the recording surfaces of various optical discs, the optical disc apparatus needs precise servo control of the optical head to cope with various optical discs or various abnormal situations.

SUMMARY

An example optical disc apparatus is provided, the optical disc apparatus including: a driver configured to rotate an optical disc having a recording surface for data; an optical pick-up configured to emit a light beam to the optical disc rotated by the driver; and at least one processor configured to operate the optical pick-up to focus the light beam emitted from the optical pick-up to perform one of recording and reproducing the data on the recording surface and to track curvature of the recording surface within a preset allowable range, and to process the light beam reflected from the recording surface, the at least one processor further configured to increase the allowable range if it is determined that the focus of the light beam cannot track the curvature of the recording surface in a section of the recording surface. Thus, the optical disc apparatus enables the pick-up unit to focus the light beam on the recording surface in a section where the recording surface is curved, and accurately records or reproduces data on the recording surface.

The at least one processor may be configured to control the optical pick-up to be adjusted in position with respect to an optical axis of the light beam in response to a focus error signal that indicates an extent of deviation of the light beam from focus on the recording surface, and may be configured to determine that the focus of the light beam cannot track the curvature of the recording surface in the section if the focus error signal has an amplitude equal to or higher than a preset value. Thus, the optical disc apparatus easily detects the section where the recording surface is curved, based on pickup results of the light beam.

The optical pick-up may derive a reproducing signal showing a data recording pattern formed along a track of the recording surface based on the light beam reflected from the recording surface, and the at least one processor may be configured to determine that the focus of the light beam cannot track the curvature of the recording surface in the section if the focus error signal has an amplitude equal to or greater than the preset value and the reproducing signal shows the data recording pattern based on the reflected light beam. Thus, the optical disc apparatus more accurately determines the section where the recording surface has curvature, than that based on only the focus error signal.

The at least one processor may be configured to increase the allowable range by increasing an operation speed of the optical pick-up with respect to a rotation speed of the optical disc. Thus, the optical disc apparatus improves accuracy of pickup of data by increasing the allowable range for the focus change of the light beam.

The driver may include a shaft configured to support the optical disc and a spindle motor for driving the shaft, and the at least one processor may be configured to increase the operation speed of the pick-up unit with respect to the rotation speed of the optical disc by decreasing revolutions per unit time of the spindle motor. Thus, the optical disc apparatus can make the focus of the light beam perform tracking along the curvature of the recording surface.

The at least one processor may be configured to increase the operation speed of the optical pick-up with respect to the rotation speed of the optical disc by increasing a focus moving speed of the light beam. Thus, the optical disc apparatus may make the focus of the light beam perform tracking along the curvature of the recording surface.

The optical pick-up may include an actuator configured to adjust a focus height of the light beam by adjusting a position of the optical pick-up along the optical axis of the light beam, and the at least one processor may be configured to increase the focus moving speed of the light beam by increasing operation sensitivity of the actuator. Thus, the optical disc apparatus copes with the curvature of the recording surface by increasing the focus moving speed of the light beam.

The actuator may be provided to increase speed of moving the optical pick-up as the operation sensitivity increases. Thus, the optical disc apparatus increases the operation sensitivity of the actuator to thereby increase the focusing moving speed of the light beam.

The optical pick-up may include a light source to generate the light beam, and at least one lens to compensate the light beam for aberration, and the actuator may be provided to move the at least one lens. Thus, the optical disc apparatus moves only some lenses without moving the whole pick-up, thereby increasing the focusing moving speed of the light beam.

An example method of controlling an optical disc apparatus is also provided, the method including: rotating an optical disc having a recording surface for data; emitting a light beam by an optical pick-up to the rotating optical disc; and operating the optical pick-up to focus the light beam emitted from the pick-up unit to perform one of recording and reproducing the data on the recording surface, and to track curvature of the recording surface within a preset allowable range; and processing the light beam reflected from the recording surface, the processing the light beam including increasing the allowable range if it is determined that the focus of the light beam cannot track the curvature of the recording surface in a section of the recording surface. Thus, the optical disc apparatus enables the optical pick-up to focus the light beam on the recording surface in the section where the recording surface is curved, and accurately records or reproduces data on the recording surface.

The processing the light beam may include: controlling the optical pick-up to be adjusted in position with respect to an optical axis of the light beam in response to a focus error signal that indicates an extent of deviation of the light beam from focus on the recording surface; and determining that the focus of the light beam cannot track the curvature of the recording surface in the section if the focus error signal has an amplitude equal to or greater than a preset value. Thus, the optical disc apparatus easily detects the section where the recording surface is curved, based on pickup results of the light beam.

The processing the light beam may include: deriving a reproducing signal showing a data recording pattern formed along a track of the recording surface based on the light beam reflected from the recording surface; and determining that the focus of the light beam cannot track the curvature of the recording surface in the section if the focus error signal has an amplitude equal to or higher than the preset value and the reproducing signal shows the data recording pattern based on the reflected light beam. Thus, the optical disc apparatus more accurately determines the section where the recording surface has curvature, than that based on only the focus error signal.

The increasing the allowable range may include increasing the allowable range by increasing an operation speed of the optical pick-up with respect to a rotation speed of the optical disc. Thus, the optical disc apparatus improves accuracy of pickup of data by increasing the allowable range for the focus change of the light beam.

The optical disc apparatus may include a shaft configured to support the optical disc and a spindle motor for driving the shaft, and the increasing the operation speed of the pick-up with respect to the rotation speed of the optical disc may include decreasing revolutions per unit time of the spindle motor. Thus, the optical disc apparatus can make the focus of the light beam perform tracking along the curvature of the recording surface.

The increasing the operation speed of the optical pick-up with respect to the rotation speed of the optical disc may include increasing a focus moving speed of the light beam. Thus, the optical disc apparatus may make the focus of the light beam perform tracking along the curvature of the recording surface.

The optical disc apparatus may include an actuator configured to adjust a focus height of the light beam by adjusting a position of the pick-up along the optical axis of the light beam, and the increasing the focus moving speed of the light beam may include increasing operation sensitivity of the actuator. Thus, the optical disc apparatus copes with the curvature of the recording surface by increasing the focus moving speed of the light beam.

BRIEF DESCRIPTION OF THE DRAWINGS

The above and/or other aspects will become apparent and more readily appreciated from the following detailed description, taken in conjunction with the accompanying drawings, in which like reference numerals refer to like elements, and wherein.

DETAILED DESCRIPTION

Example embodiments will be described in greater detail below with reference to accompanying drawings. The following descriptions of the example embodiments are made by referring to elements illustrated in the accompanying drawings, in which like numerals refer to like elements having substantively the same functions.

In the detailed description, an ordinal number may be used in terms such as a first element, a second element, etc. and employed for describing variety of elements, and the terms are used for distinguishing between one element and another element. Therefore, the meanings of the elements are not limited by the terms, and the terms are also used just for explaining the corresponding example embodiment without limiting the disclosure.

Further, the example embodiments may only describe elements directly related to the idea of the disclosure, and description of the other elements may be omitted. However, it will be appreciated that the elements, the descriptions of which are omitted, are not unnecessary to realize the apparatus or system according to the example embodiments. In the following descriptions, terms such as "include" or "have" refer to presence of features, numbers, steps, operations, elements or combination thereof, and do not exclude presence or addition of one or more other features, numbers, steps, operations, elements or combination thereof.

Figure 1:
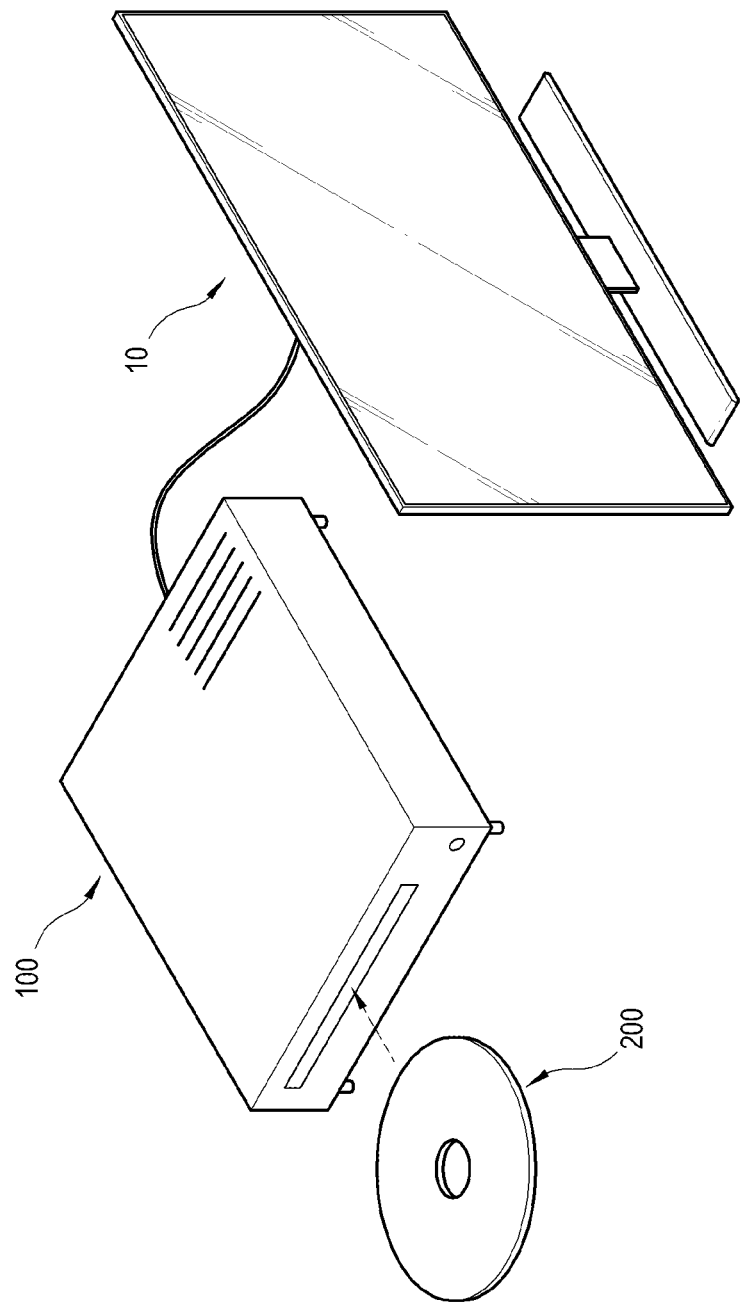
FIG. 1 is a diagram illustrating example use of an optical disc apparatus.

FIG. 1 is a diagram illustrating an example use of an optical disc apparatus 100 according to a first example embodiment.

As illustrated in FIG. 1, the optical disc apparatus 100 may be an electronic apparatus capable of reading data from an optical disc 200 or recording data in the optical disc 200. The data to be recorded in the optical disc 200 may include various kinds of data such as image data, or the like. In this example embodiment, the optical disc apparatus 100 processes the image data read from the optical disc 200 in accordance with image processing processes, and outputs the processed image data to a locally connected display apparatus 10 so that an image can be displayed on the display apparatus 10.

The optical disc 200 may include various kinds of discs such as a compact disc (CD), a digital versatile disc (DVD), a Blu-ray disc (BD), etc. Further, the optical disc 200 may be provided in the forms of only reading recorded data, writing new data, etc. The optical disc 200 may be achieved by a disc itself or a disc accommodated in a cartridge, or the like.

As an example of the optical disc 200, a BD is an optically recordable storage medium defined by Blu-ray Disc Association (BDA) to store digital data for high definition (HD) video. The BD apparatus employs a laser having a wavelength of 405 nm shorter than that of a DVD in order to read recorded data, and thus stores more data than the DVD even though they have the same size. The existing BD having a single-layered recording surface and having a diameter of 12 cm can store 25 gigabytes of data. In case of a dual-layered BD, its capacity is doubled to store 50 gigabytes.

There are various types of BDs such as a BD-ROM from which data is only readable, a BD-R in which data is recordable once, a BD-RE in which data is rewritable, etc.

Further, various illegal-copy protection techniques have been applied to protect image data recorded in the BD from unauthorized duplication. These techniques are differently applied based on the types of discs. Thus, even if the illegal-copy protection technique is incapacitated with regard to one kind of disc, an illegal-copy protection technique of another disc is enabled. In addition, a watermarking technique has been used and it is thus easy to check a manufacturer or the like of the BD-ROM, thereby preventing an unauthorized manufacturer from illegally copying the disc.

The optical disc apparatus 100 may be functionally classified into the type of only reading data from the optical disc 200 or the type of additionally recording data in the optical disc 200. In this example embodiment, the optical disc apparatus 100 cannot display an image by itself. Alternatively, the optical disc apparatus 100 may display an image based on the image data from the optical disc 200.

Schematic operations of the optical disc apparatus 100 are described below.

The optical disc apparatus 100 records or reads data by emitting a light beam of a laser to a spiral track formed on the recording surface of the optical disc 200. The data is recorded by forming a pit in the track, and the data is read by analyzing change in an amount of light emitted to and reflected from the track formed with the pits.

The optical disc apparatus 100 forms an optical spot by focusing a light beam, which is generated by a laser diode and passes through an objective lens or the like optical components, on the track of the rotating optical disc 200. To record or reproduce data in the optical disc 200, such an optical spot has to be continuously formed on a very narrow track.

However, the surface of the optical disc 200 may be curved, and the track may be eccentrically positioned when the optical disc 200 is rotated in the optical disc apparatus 100. For this reason, the optical spot may deviate from the track when the optical disc 200 rotates if driving control is not applied to the light beam. Therefore, in order to focus and track the optical spot on a target track, the optical disc apparatus 100 typically performs two kinds of servo controls, i.e. the focus servo control and the tracking servo control, thereby controlling the light beam emitted to the optical disc 200.

The focus servo control drives the optical lens in a normal direction perpendicular to the recording surface of the optical disc 200 so as to focus the optical spot on the track of the optical disc 200, thereby controlling a vertical position of the optical spot with respect to the recording surface. On the other hand, the tracking servo control drives the optical lens in a radial direction of the optical disc so as to form the optical spot along the center of the track, thereby controlling a horizontal position of the optical spot with respect to the recording surface. The optical disc apparatus 100 may adjust the position of the optical spot so that both the focus error signal of the focus servo control and the tracking error signal of the tracking servo control can become 0. More detailed operations of the optical disc apparatus 100 will be described below.

Figure 2:
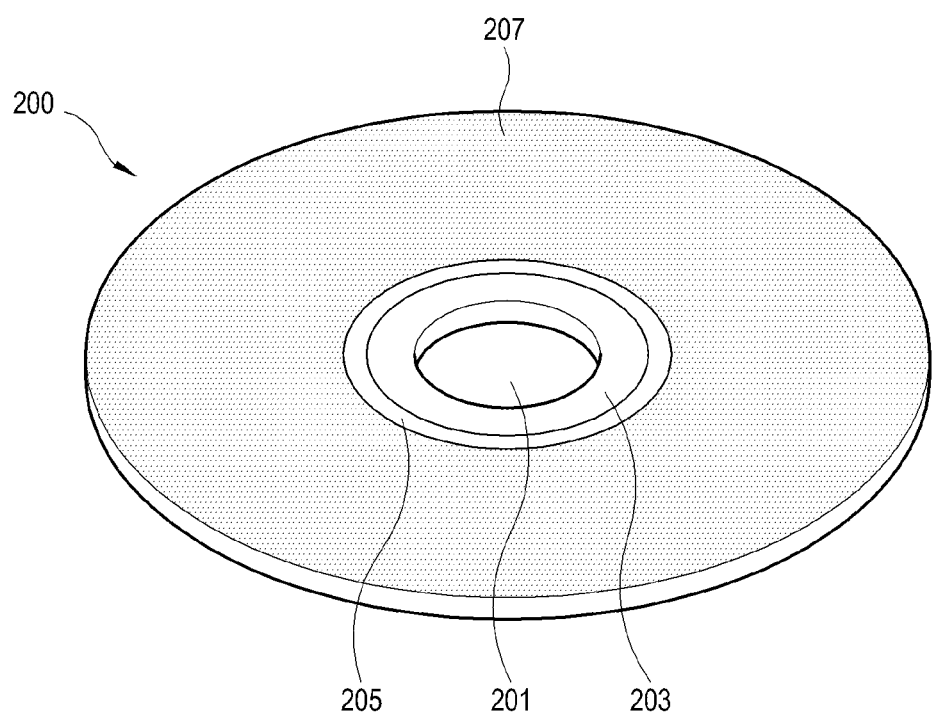
FIG. 2 is a diagram illustrating an example optical disc loaded to the optical disc apparatus of FIG. 1.

FIG. 2 is a diagram illustrating the appearance of the optical disc 200.

As illustrated in FIG. 2, the optical disc 200 is shaped like a disc formed with a hole 201 at the center thereof. The optical disc 200 includes a clamping portion 203, a power calibration area (PCA) 205 and an information area 207 from a clamping hole 201 in a direction from a central clamping hole 201 toward an outer circumference.

The clamping hole 201 receives a shaft (not shown) of a motor (not shown) so as to be supported in the optical disc apparatus 100 when the optical disc 200 is loaded into the optical disc apparatus 100.

The clamping portion 203 is formed around the clamping hole 201, and held in the optical disc apparatus 100 in order to make the optical disc 200 rotate in place.

The PCA 205 is a test area for optimizing the power of the laser emitted to the optical disc 200 when data is reproduced from the optical disc 200 or data is recorded in/deleted from the optical disc 200. The PCA 205 may be decreased whenever such a test operation, i.e. power calibration is performed, and the number of operation times is recorded.

The information area 207 is an area of the optical disc 200, in which data is substantially recorded and stored. When the data is recorded, at least one lead-in area, at least one data area and at least one lead-out area are sequentially formed in the information area 207. If the optical disc 200 and the optical disc apparatus 100 support multi-session, groups of the lead-in area, the data area and the lead-out area are formed in the information area 207 in proportion to the number of multi-sessions.

Figure 3:
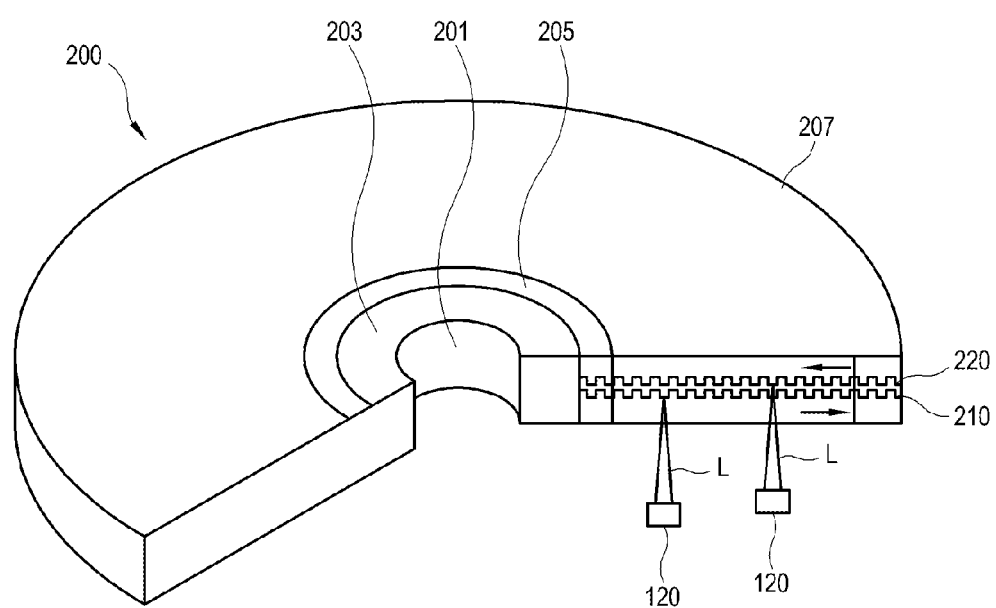
FIG. 3 is a cross-sectional view of the example optical disc loaded to the optical disc apparatus of FIG. 1.

FIG. 3 is a cross-sectional diagram of the optical disc 200. In this example embodiment, the optical disc 200 includes a plurality of recording surfaces. For example, the optical disc 200 includes double recording layers. However, the optical disc 200 may have a recording surface of a single layer or three or more recording layers. Thus, the optical disc 200 is not limited by the number of recording layers.

As illustrated in FIG. 3, the optical disc 200 includes two recording layers 210 and 220 for recording data. In the case of the dual-layered optical disc 200 having two recording layers 210, 220, a lower recording layer 210 will be called a layer-0 210, and an upper recording layer 220 will be called a layer-1 220. On the surface of the layer-0 210, a protection layer is formed to protect the layer-0 210 from an external shock.

Each of two recording layers 210 and 220 is formed with a spiral continuous track in which data is recorded. A pick-up module 120 moves from an inner circumference of the optical disc 200 toward the outer circumference or from the outer circumference toward the inner circumference, and emits a laser L to a track of the recording layer 210 or 220 in order to reproduce or record data. If it is desired to read data from the layer-0 210, the pick-up module 120 focuses the laser L on the recording surface of the layer-0 210 and thus forms the optical spot of the laser L on the recording surface of the layer-0 210. On the other hand, if it is desired to read data of the layer-1 220, the pick-up module 120 focuses the laser L on the recording surface of the layer-1 220. Therefore, the pick-up module 120 can pick up data from the desired recording layers 210 and 220.

Figure 4:
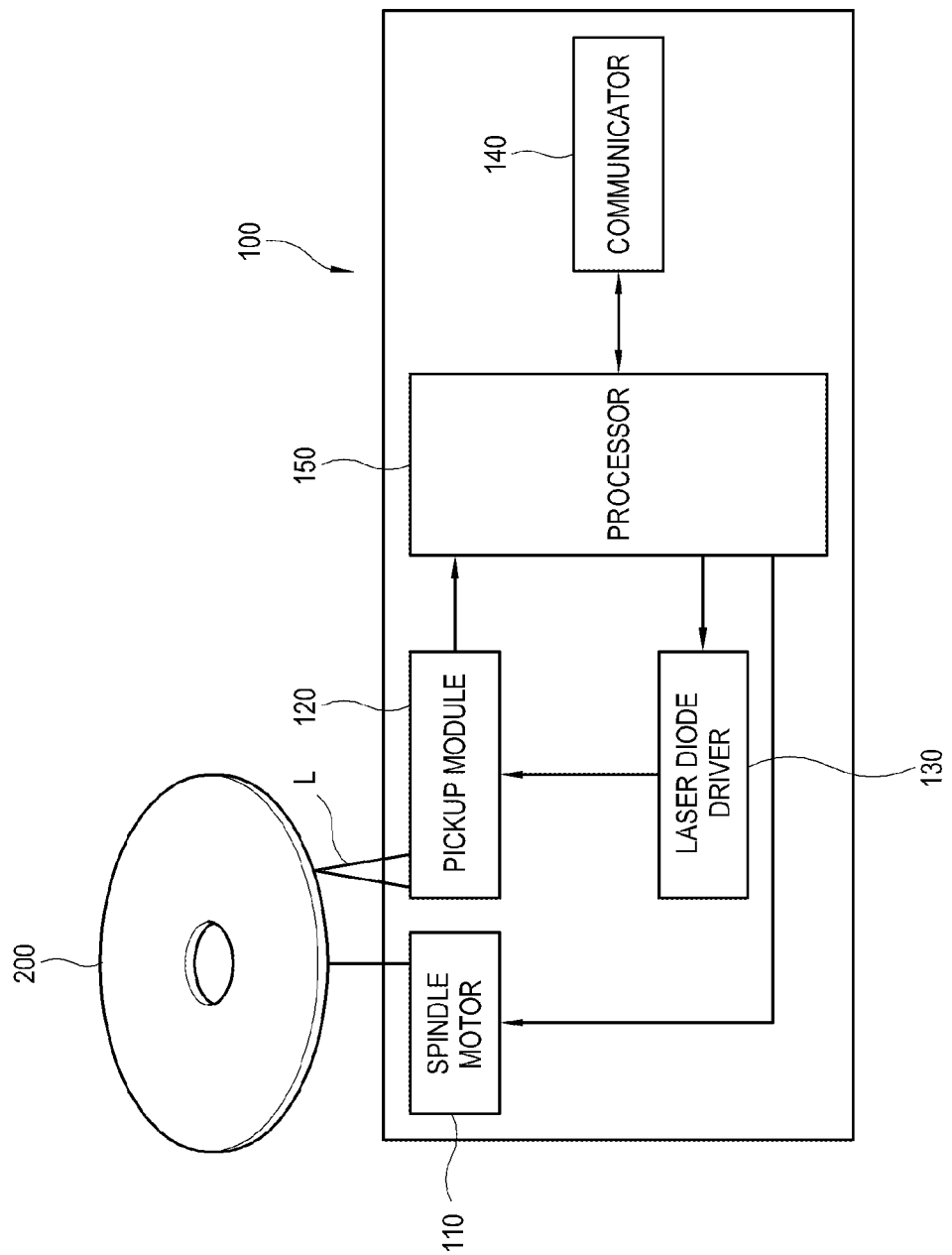
FIG. 4 is a block diagram illustrating the example optical disc apparatus of FIG. 1.

FIG. 4 is a block diagram illustrating an example of the optical disc apparatus 100.

As illustrated in FIG. 4, the optical disc apparatus 100 includes a spindle motor 110 for rotating the optical disc 200; a pick-up, e.g., a pick-up module 120 for emitting the laser L to the optical disc 200 and picking up light from the optical disc 200; a laser diode driver 130 for driving the laser diode (not shown) to emit the laser L in the pick-up module 120; a communicator (e.g., including communication circuitry) 140 for communicating with another apparatus (not shown) provided outside the optical disc apparatus 100 or a network; and a processor 150 configured to control and process general elements to operate the optical disc apparatus 100. Besides the foregoing elements, the optical disc apparatus 100 may further include various elements, for example, a power supply (not shown) for supplying power, a user input (not shown) for receiving a user's input, etc. when it is realized as an actual product.

The spindle motor 110 rotates the optical disc 200 loaded to the optical disc apparatus 100 in response to a driving signal from the processor 150. The spindle motor 110 supports the clamping portion 203 (see FIG. 2) as the shaft (not shown) passes through the clamping hole 201 (see FIG. 2) of the optical disc 200. The performance of the spindle motor 110 may be represented by revolution per minute, i.e. RPM. In general, the spindle motor 110 rotates the optical disc 200 at a high speed of 5500 RPM or higher.

The pick-up module 120 with the laser diode (not shown) emits the laser L having preset recording power to the recording surface of the optical disc 200 so as to record data in the optical disc 200, or emits the laser L having preset reproducing power to the recording surface of the optical disc 200 so as to read and reproduce data recorded in the optical disc 200. If it is desired to delete the data from the optical disc 200, the pick-up module 120 emits the laser L having preset deleting power to the recording surface of the optical disc 200.

The laser diode driver 130 calibrates the power of the laser diode (not shown) provided in the pick-up module 120 based on a driving signal from the processor 150. The calibration of the power changes the characteristic of the laser L emitted to the optical disc 200, and thus changes the operation of the pick-up module 120 with regard to the optical disc 200.

The processor 150 is configured to basically control the operations of the optical disc apparatus 100. For example, the processor 150 may be configured to control the operations of the spindle motor 110, the pick-up module 120 and the laser diode driver 130 based on whether to record or reproduce the optical disc 200. The processor 150 may be achieved by a main board (not shown) where various chipsets and electronic components are mounted (e.g., processing circuitry, CPU, etc.), or a system-on-chip (SOC).

Elements of the processor 150 will be described in greater detail below.

Figure 5:
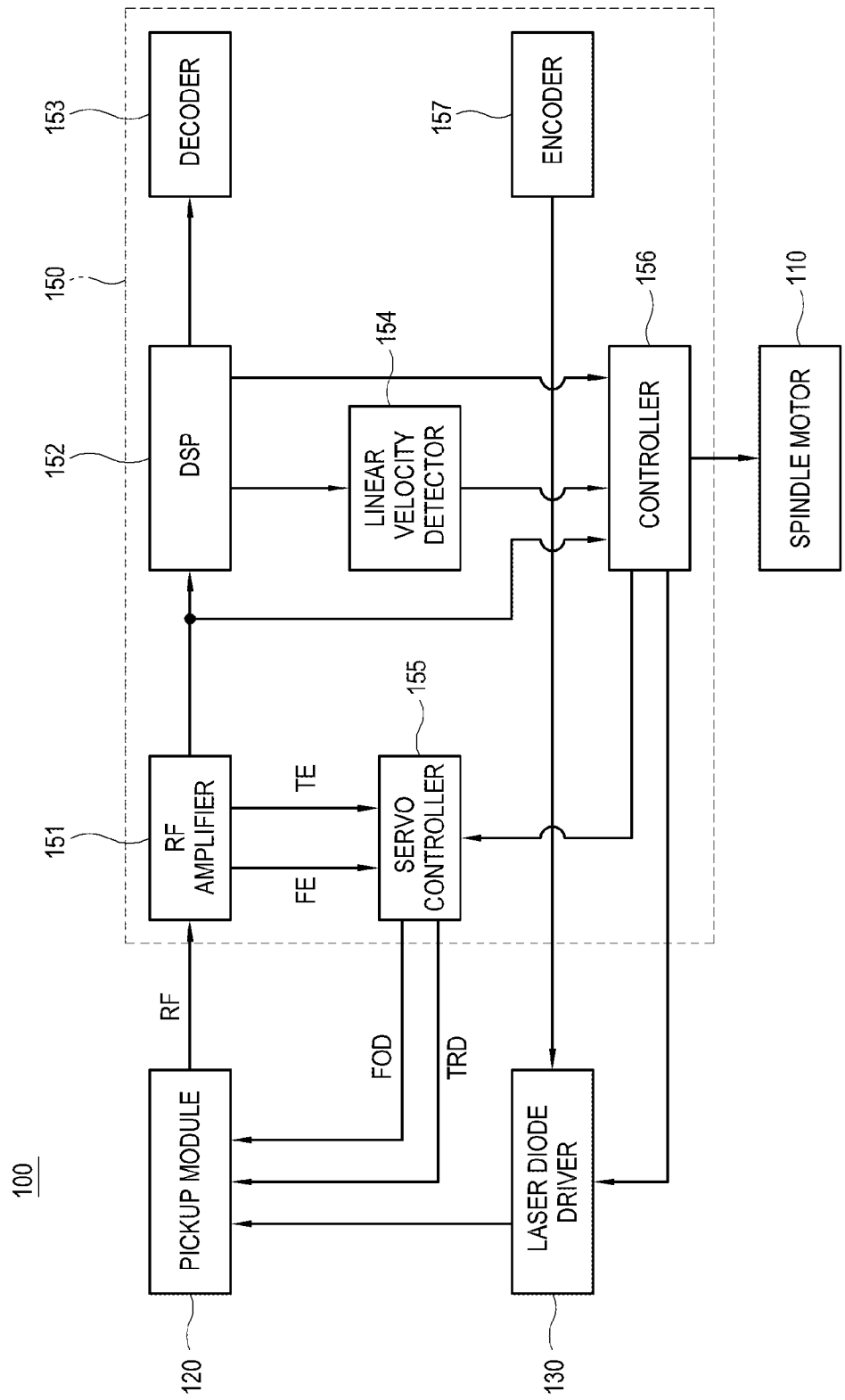
FIG. 5 is a block diagram illustrating details of an example processor in the optical disc apparatus of FIG. 1.

FIG. 5 is a block diagram illustrating example elements of the processor 150.

As illustrated in FIG. 5, the processor 150 may include an RF amplifier 151, a digital signal processor (DSP) 152, a decoder 153, a linear velocity detector 154, a servo controller 155, a controller 156, and an encoder 157. This example embodiment illustrates one of various examples of the processor 150, and it will be understood that the disclosure is not limited to this example processor 150. For example, the processor 150 may exclude some elements from the foregoing elements. Further, the processor 150 may include additional elements not mentioned above.

When data is recorded in the optical disc 200, the corresponding data is encoded by the encoder 157 and then provided to the laser diode driver 130. The controller 156 is configured to provide the laser diode driver 130 with a driving signal for recording the encoded data in the recording surface of the optical disc 200, thereby changing the power of the laser emitted from the pick-up module 120.

When the data recorded in the optical disc 200 is reproduced, the controller 156 is configured to control the laser diode (not shown) in the pick-up module 120 to generate the laser having the reproducing power. The laser emitted to the optical disc 200 is reflected from the recording surface of the optical disc 200 and then received in the light receiver (not shown) of the pick-up module 120. For example, the light receiver (not shown) may for example include a photodiode.

The pick-up module 120 generates an RF signal corresponding to the amount of received light and transmits it to the RF amplifier 151.

The RF amplifier 151 amplifies the RF signal from the pick-up module 120 into a binary signal, and transmits it to the DSP 152. The DSP 152 is configured to restore the binary signal from the RF amplifier 151 into digital data. Since the restored digital data is in an encoded state, the decoder 153 is configured to decode the digital data from the DSP 152.

The DSP 152 determines a peak value, a bottom value, an average value, etc. from the RF signal and provides them to the controller 156. Further, the linear velocity detector 154 detects the linear velocity of the rotating optical disc 200 and provides it to the controller 156.

The RF amplifier 151 may include, for example, a built-in focus error detecting circuit and a built-in tracking error detecting circuit, may extract the focus error signal (FE) and the tracking error signal (TE) from the amplified RF signal, and may provide them to the servo controller 155.

The focus error signal FE is a signal that exhibits or indicates an extent of deviation of a light beam from focus on the recording surface of the optical disc 200 along the vertical direction, and the tracking error signal TE is a signal that exhibits or indicates an extent of deviation of a light beam from focus on the recording surface of the optical disc 200 along the horizontal direction. If the light beam is focused on a normal position for picking up data, the focus error signal FE and the tracking error signal TE are shown as waveforms propagated within respective preset allowable ranges with respect to 0 as time goes by.

However, if the light beam is not focused on the normal position on the recording surface of the optical disc 200 in the vertical direction, the focus error signal FE is deviated from the allowable range. Likewise, the light beam may not be focused on the normal position on the recording surface of the optical disc 200 in the horizontal direction, the tracking error signal TE may deviate from the allowable range.

The servo controller 155 may include, for example, a focus servo control loop and a tracking server control loop. The servo controller 155 generates a focus driving signal FOD by compensating the focus error signal FE for a gain and a phase to be within the allowable range, and thus performs the focus servo control for the pick-up module 120.

The focus driving signal FOD is a signal for driving a focus actuator (not shown) that vertically moves the optical lens (not shown) in the pick-up module 120. Further, the focus driving signal FOD is a signal for mechanically moving the optical lens (not shown) along an optical axis in a normal direction perpendicular to the recording surface of the optical disc 200. The focus actuator (not shown) actuates the optical lens (not shown) to vibrate and track the recording surface of the optical disc 200 along the normal direction.

Further, the servo controller 155 generates a tracking driving signal TRD by compensating the tracking error signal TE for a gain and a phase, and thus performs the tracking servo control for the pick-up module 120. The tracking driving signal TRD is a signal for driving the tracking actuator (not shown) that horizontally moves the optical lens (not shown) in the pick-up module 120.

The controller 156 is configured to control a servo control procedure based on a signal loop of the RF amplifier 151, the servo controller 155 and the pick-up module 120. For example, the controller 156 is configured to analyze the RF signal to determine whether there is a defect and to specify a defect section. Fundamentally, the defect not only distorts or omits the RF signal, but also causes an error in the servo control necessary for reproducing a signal. Thus, the controller 156 is configured to send the servo controller 155 a hold signal for holding the servo control in the defect section if the defect section is specified.

The hold does not necessarily mean stopping the servo control, but implements the servo control by keeping the compensation values of the gain and the phase for the servo control at a point of time before the corresponding defect section. The point of time before the defect section refers to a point of time in a normal section where there is no defect before the light beam enters the defect section.

The controller 156 is configured to perform the servo control by determining the compensation values from the focus error signal FE and the tracking error signal TE if the defect section is not determined.

In addition, the controller 156 is configured to perform feedback control of the servo control signal of the corresponding defect section when the next defect is detected, based on variance in the servo control signal after the defect section corresponding to the detected defect. The servo control signal may include at least one of the focus error signal FE and the tracking error signal TE.

The controller 156 is configured to determine the corresponding compensation value to decrease the variance of the servo control signal after the defect section, and applies the determined compensation value to the servo control signal of the corresponding defect section when the next defect section is detected.

Further, the controller 156 may be configured to determine the compensation value to be applied to the servo control signal of the next defect section, by relatively applying the compensation value determined in the current defect section with regard to the compensation value determined after the previous defect section. For example, if the previously determined compensation value is '100', the controller 156 may be configured to determine the compensation value to be applied to the servo control signal of the next defect section in the form of adding or subtracting the compensation value determined in the current defect section to or from the previously determined compensation value of '100'.

A defect on the recording surface of the optical disc 200 will be described in greater detail below.

Figure 6:
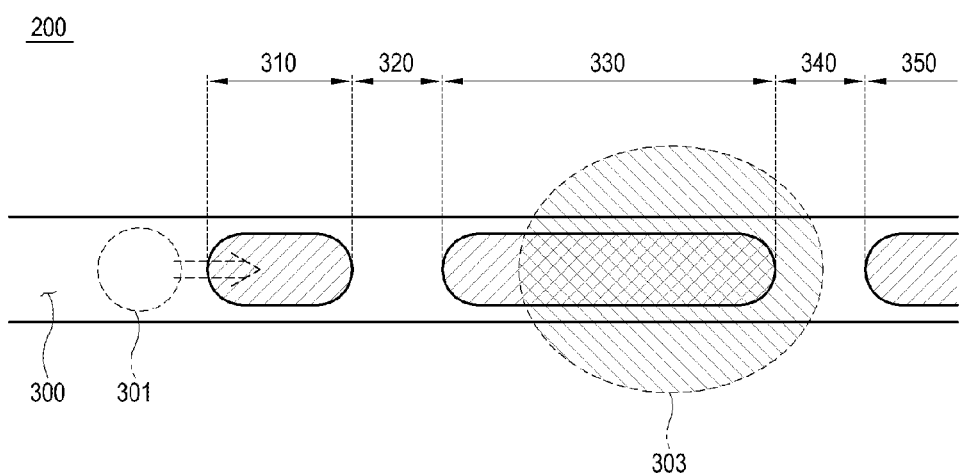
FIG. 6 is a diagram illustrating an example part of a certain track on a recording surface of the optical disc loaded to the optical disc apparatus of FIG. 1.

FIG. 6 is a diagram illustrating an example of a part of a certain track 300 on a recording surface of the optical disc 200.

As illustrated in FIG. 6, the pick-up module 120 (see FIG. 5) moves an optical spot 301 formed on the track 300 along the track 300 as the optical disc 200 rotates. In the track 300, recording areas 310, 330 and 350 where data is recorded and non-recording areas 320 and 340 where data is not recorded are alternately formed. Each length of the recording areas 310, 330 and 350 is designated as one within a range from 2 T to 10 T, in which T is a unit of length. For example, each of the recording areas 310, 330 and 350 on the track 300 has a length corresponding to one of nine cases from 2 T to 10 T.

While the optical spot 301 moves on the track 300, light is reflected from the recording areas 310, 330 and 350 and picked up by the pick-up module 120 (see FIG. 5). If light is normally reflected from the recording areas 310, 330 and 350 since the track 300 has no defect 303, a record reproducing signal, e.g., an RF signal is generated based on light reflected from the recording areas 310, 330 and 350 corresponding to lengths of 2 T to 10 T as time goes by. The RF signal is a reproducing signal picked up based on light reflection corresponding to a recording pattern of data formed along the track of the optical disc 200.

The defect 303 may refer, for example, to a matter or situation, which disturbs the light reflection, on the recording surface of the optical disc 200. For example, if the defect 303 exists on the track 300, it is impossible to reproduce data from the optical disc 200 since the light is not reflected in an area corresponding to the defect 303. For example, among various abnormal situations on the recording surface of the optical disc 200, the defect 303 disturbs pickup of data even though the light beam for the pickup is normally focused on the recording surface. The defect 303 may, for example, be caused by dust or foreign materials attached on the recording surface or scratches on the recording surface.

Figure 7:
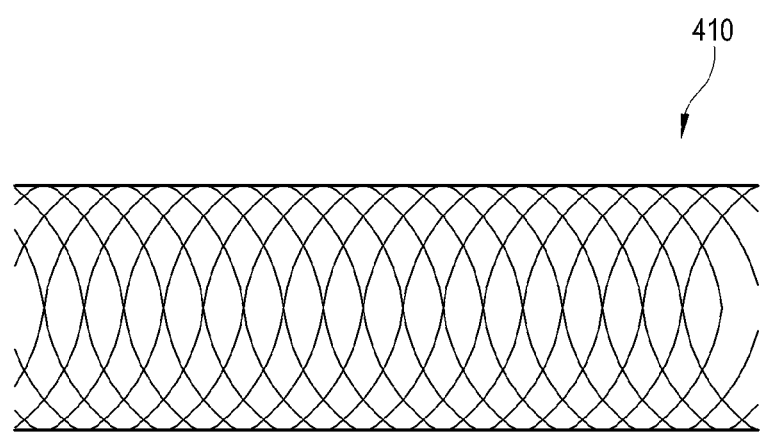
FIG. 7 is a waveform diagram illustrating an example radio frequency (RF) signal generated in the optical disc apparatus of FIG. 1, in a normal case where the optical disc has no defect.

FIG. 7 is a diagram illustrating an example waveform of a radio frequency (RF) signal 410 generated in a normal case where the optical disc has no defect.

As illustrated in FIG. 7, while the optical disc having no defect is rotated, the RF signal 410 is generated by picking up the light beam emitted to the recording surface of the optical disc. The RF signal 410 is patterned in such a manner that a lattice formed by a plurality of lines within a range between a predetermined peak value and a predetermined bottom value propagates as time goes by. For example, a normal RF signal 410 is given in the form of a certain alternating current. The respective lines in the RF signal 410 correspond to respective recording areas of data formed along the track of the optical disc as described above. For example, the lines may correspond to the recording areas of 2 T, 3 T, 4 T to 10 T, respectively.

In the RF signal 410, a signal of lines connecting the peak values among the plurality of lines is called a peak signal, and a signal of lines connecting the bottom values among the plurality of lines is called a bottom signal. In the normal RF signal 410 having no defect, the peak signal and the bottom signal are propagated in parallel with each other leaving a predetermined interval as time goes by.

However, if there is a defect on the recording surface of the optical disc, the RF signal exhibits different forms from the RF signal 410.

Figure 8:
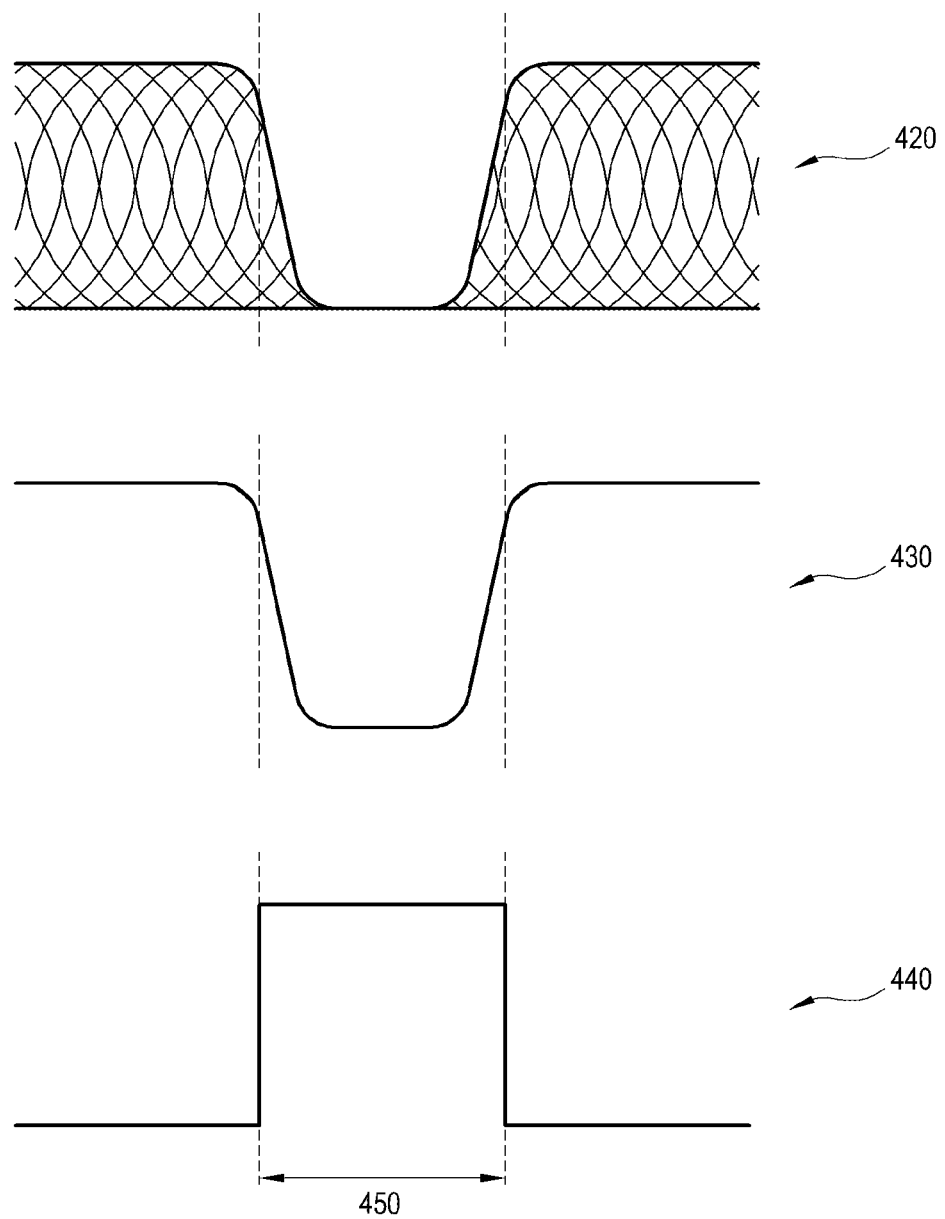
FIG. 8 are waveform diagrams illustrating an example RF signal generated when the optical disc has a defect and a defect signal derived from the RF signal, in the optical disc apparatus of FIG. 1.

FIG. 8 is a diagram illustrating example waveforms of an RF signal 410 generated when the optical disc has a defect and a defect signal 440 derived from the RF signal.

As illustrated in FIG. 8, if a light beam moving along the track of the optical disc passes a defect section 450 having a defect on the optical disc, there is no reflection of the light beam in the defect section 450. In other words, the optical disc apparatus can determine a detection value due to normal light reflection in the corresponding recording area while the light beam moves in the normal recording area of the track, but cannot determine a detection value due to light reflection while the light beam passes the defect section 450. Therefore, the lines according to the respective recording areas are not shown in the defect section 450 of the generated RF signal 410.

Regarding only the peak signal 430 of the RF signal 410, its level drops to the bottom signal in the defect section 450. If the defect section 450 is high and the other sections are low taking such a peak signal 430 into account, a defect signal 440 showing the defect section 450 is generated. With this procedure, the optical disc apparatus detects and determines a section where there is a defect.

The optical disc apparatus basically performs mechanical servo control in order to precisely pick up an RF signal from the optical disc. To precisely pick up data recorded in the optical disc, the light beam has to be correctly focused on the recording surface of the optical disc, and not deviated from the track of the optical disc. Therefore, the optical disc apparatus gets feedback on the current position of the light beam, and continuously compensates for mechanical operations of the pick-up module that emits the light beam. This is generally referred to as the servo control, and it is possible to correctly pick up the data of the optical disc by the servo control.

Figure 9:
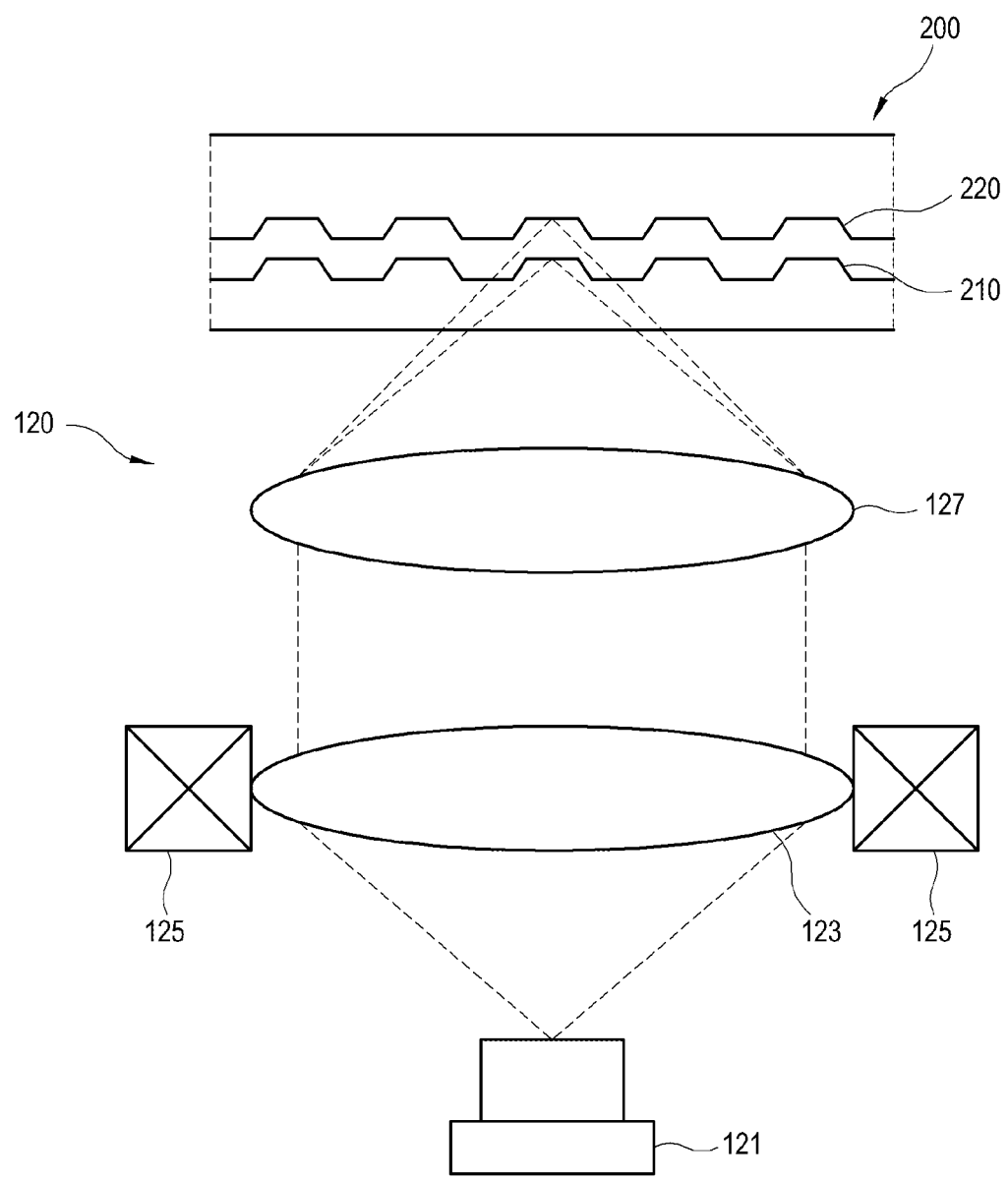
FIG. 9 is a diagram illustrating an example structure of a pick-up module in the optical disc apparatus of FIG. 1.

FIG. 9 is a diagram illustrating an example structure of the pick-up module 120.

As illustrated in FIG. 9, the pick-up module 120 of the optical disc apparatus 100 may include, for example, a laser diode 121 that generates a light beam; a first lens 123 and a second lens 127 that compensate for an aberration of the light beam; and an actuator 125 that actuates at least one of the first lens 123 and the second lens 127. The first lens 123 and the second lens 127 may include a collimator lens and an objective lens, and the actuator 125 is provided to actuate the first lens 123. The pick-up module 120 is not limited to the foregoing example embodiment.

If the optical disc 200 is a high-density disc such as a BD, distortion may be caused by an aberration. The actuator 125 moves forward or backward along an optical axis and thus changes a characteristic of the light beam, thereby compensating for the aberration. Alternatively, the actuator 125 may move on the recording surface of the optical disc 200, 210 and 220, thereby moving the focusing position of the light beam. In this example, the actuator 125 may actuate the entire pick-up module 120 to move.

If the optical disc 200 has two recording surfaces 210 and 220, the actuator 125 adjusts the position of the first lens 123 relative to the second lens 127 so that the light beam can be focused on one of the first recording surface 210 and the second recording surface 220. For example, if the actuator 125 actuates the first lens 123 to be in a preset first position, the light beam is focused on the first recording surface 210 and it is thus possible to pick up the data from the first recording surface 210. Further, if the actuator 125 actuates the first lens 123 to be in a preset second position different from the first position, the light beam is focused on the second recording surface 220 and it is thus possible to pick up the data from the second recording surface 220.

A control method of the optical disc apparatus according to an example embodiment will be described in greater detail below with reference to FIG. 10.

Figure 10:
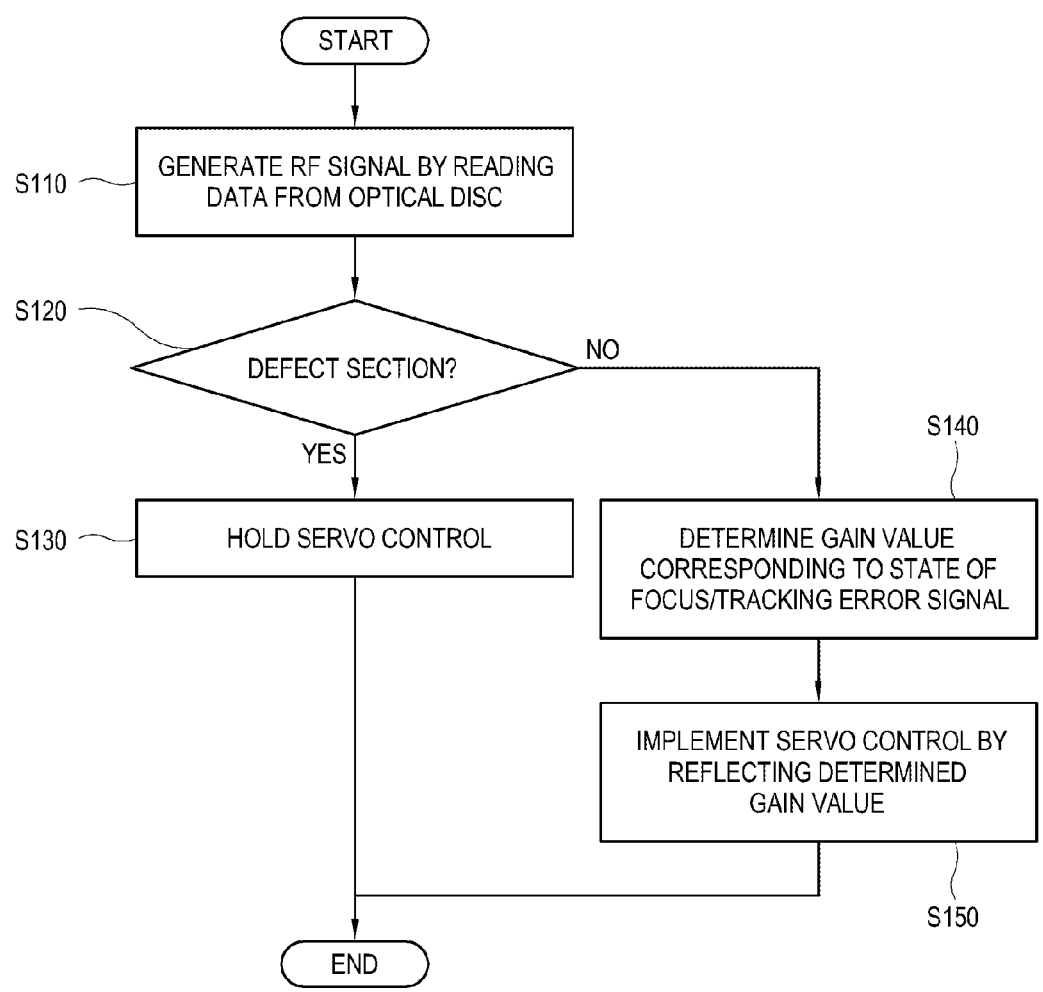
FIG. 10 is a flowchart illustrating an example control method of the optical disc apparatus of FIG. 1.

FIG. 10 is a flowchart illustrating an example control method of the optical disc apparatus.

As illustrated in FIG. 10, at operation S110 the optical disc apparatus reads data recorded in an optical disc and generates an RF signal. As a method of reading the data from the optical disc, reflection light of the light beam focused on the recording surface of the optical disc is picked up.

At operation S120 the optical disc apparatus analyzes the RF signal to determine whether a defect exists in a certain section, e.g., whether the corresponding section corresponds to the defect section. The defect section may be determined as a section where the defect signal 450 (see FIG. 8) is high as described above.

If it is determined that the corresponding section has a defect, the optical disc apparatus holds the servo control at operation S130. The hold of the servo control means that the servo control is implemented by maintaining the gain value determined under the servo control of the previous section.

On the other hand, if it is determined that the corresponding section has no defect, the optical disc apparatus determines gain values corresponding to the focus error signal and the tracking error signal at operation S140. Further, at operation S150 the optical disc apparatus performs the servo control by reflecting the determined gain value.

Thus, the optical disc apparatus according to an example embodiment performs the servo control corresponding to the defect.

Typically, an RF signal is not generated or has a very low level in the defect section, and it is therefore difficult to generate the servo control signal or the tracking error signal. Therefore, the servo control is not normally implemented in the defect section. Thus, it is possible to stably get out of the defect section through the hold operation.

An abnormal situation of disturbing pickup of data on the recording surface of the optical disc is vertical deviation as described in greater detail below.

Figure 11:
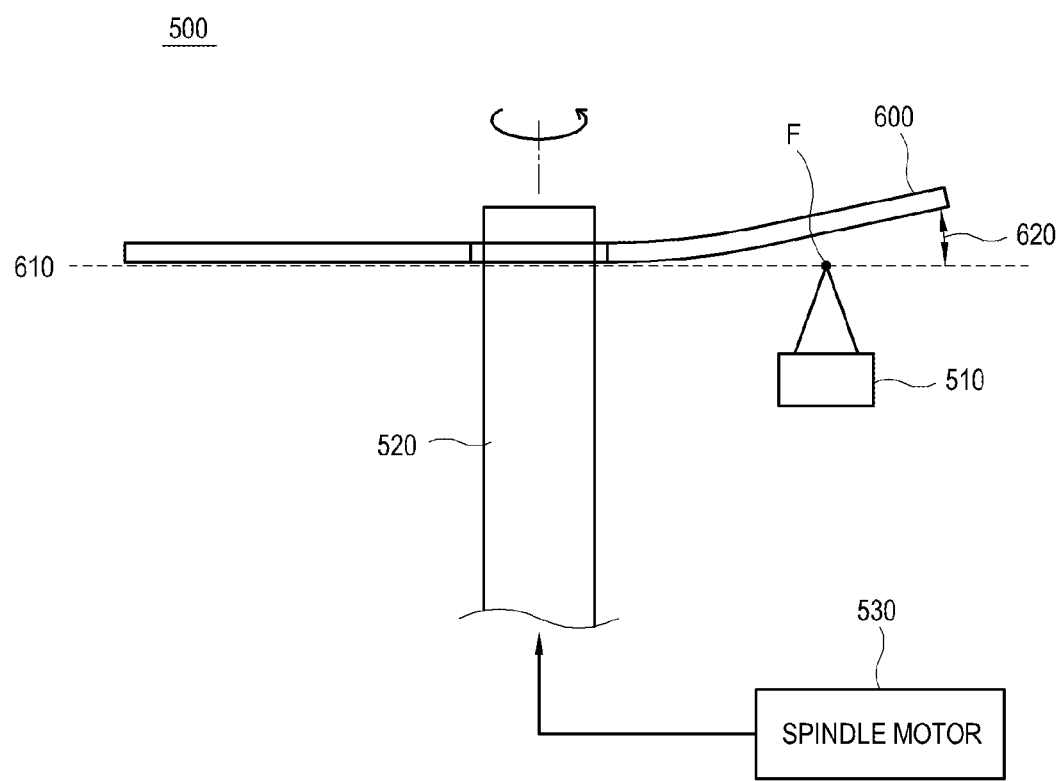
FIG. 11 is a diagram illustrating an example form of the optical disc loaded to an optical disc apparatus.

FIG. 11 is a diagram illustrating an example form of an optical disc 600 loaded to an optical disc apparatus 500 according to a second example embodiment.

As illustrated in FIG. 11, an optical disc apparatus 500 includes a shaft 520 on which the optical disc 600 is placed, and a pick-up module 510 which emits a laser L to the recording surface on the optical disc 600 and picks up data. The other elements of the optical disc apparatus 500 are similar to those described in the first example embodiment above, and thus repetitive descriptions thereof may be omitted as necessary.

The shaft 520 is driven by the spindle motor 530 to rotate the optical disc 600 supported at one end of the shaft 520. The pick-up module 510 forms an optical spot F of the laser L on the recording surface of the rotating optical disc 600, and picks up the reflected light, thereby acquiring data.

Principally, the recording surface of the optical disc 600 has to be flat. However, the recording surface of the optical disc 600 may be partially not flat. If such a optical disc 600 is put on the shaft 520, there may occur a vertical deviation where the corresponding partial recording surface is spaced apart by a distance 620 from a reference surface 610. In the foregoing example embodiment, the defect on the recording surface disturbs the pickup of the data since it does not reflect light. However, the vertical deviation allows the data to be picked up as long as the optical spot F is normally focused on the recording surface.

When the pick-up module 510 focuses the optical spot F of the laser L on the reference surface 610, there is no problem in a normal recording surface. However, in a section where a vertical deviation causes the distance 620 from the reference surface 610 as described above, the optical spot F is not focused on the recording surface and there is a problem of picking up the data.

This problem may be addressed as follows. The section having the distance 620 from the reference surface 610 periodically occurs per ½ rotation of the optical disc 600. Therefore, the vertical deviation in this example embodiment will be referred to as a periodic vertical deviation. The periodic vertical deviation is sufficiently estimated by the optical disc apparatus 500 since it occurs periodically.

If the optical disc apparatus 500 enters the periodic vertical deviation section while normally implementing the servo control, the optical disc apparatus 500 may be configured to control a focus gain value in the corresponding deviation section and thus adjusts a vertical position of the optical spot F. Thus, the optical spot F formed by the pick-up module 510 can be formed on the recording surface. The description about the normal servo control is similar to that of the foregoing example embodiment, and therefore repetitive descriptions thereof may be omitted.

The focus gain value is estimated by determining the distance 620 between the current position of the optical spot F and the recording surface, and corresponding to the determined distance 620. This may be determined by simulation before picking up the data of the optical disc 600.

If it is determined that the optical disc apparatus 500 is out of the vertical deviation section, the optical disc apparatus 500 is returned to implement the servo control. For example, the focus gain value is previously estimated with regard to the periodic vertical deviation, and then the previously estimated focus gain value is applied to the vertical deviation section, thereby forming the optical spot F on the recording surface.

A control method of the optical disc apparatus according to an example embodiment will be described in greater detail below with reference to FIG. 12.

Figure 12:
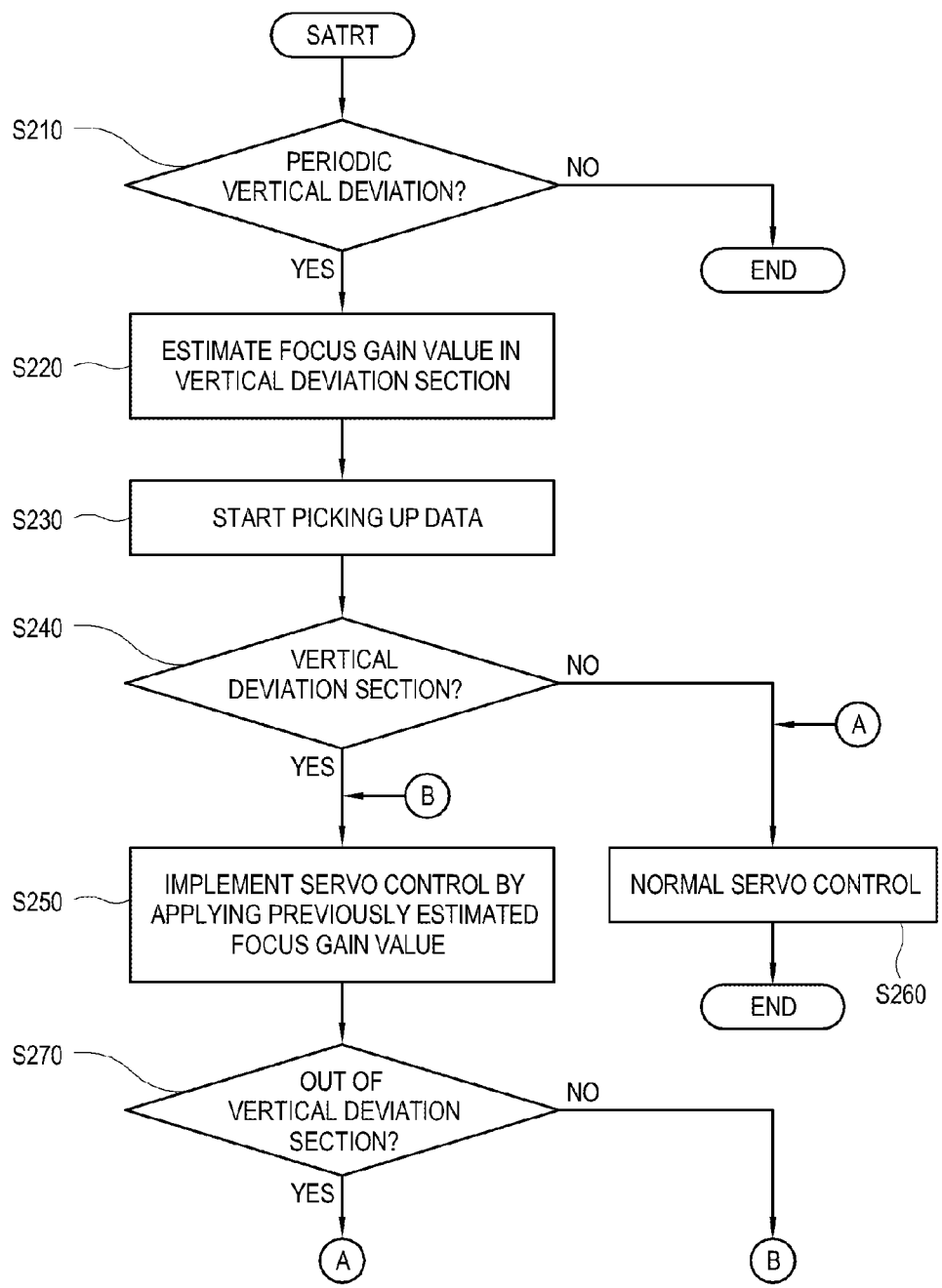
FIG. 12 is a flowchart illustrating an example control method of the optical disc apparatus.

FIG. 12 is a flowchart illustrating an example control method of the optical disc apparatus.

As illustrated in FIG. 12, at operation S210 the optical disc apparatus determines whether the optical disc has the periodic vertical deviation.

If the optical disc has the periodic vertical deviation, at operation S220 the optical disc apparatus estimates the focus gain value of the vertical deviation section. The estimated focus gain value includes the compensation value for variance in position. For example, the distance 620 (see FIG. 11) from the reference surface 610 (see FIG. 11) becomes larger toward the outer circumference of the optical disc, and therefore variance in the focus gain value is expected with respect to these positions.

At operation S230, the optical disc apparatus starts picking up data of the optical disc.

At operation S240, the optical disc apparatus determines whether a section is the vertical deviation section.

If it is determined that the section is the vertical deviation section, at operation S250 the optical disc apparatus performs the servo control based on the previously estimated focus gain value. On the other hand, if it is determined that the section is not the vertical deviation section, at operation S260 the optical disc apparatus performs the normal servo control.

At operation S270 the optical disc apparatus determines whether it is out of the vertical deviation section. If it is determined that the optical disc apparatus is not out of the vertical deviation section, the optical disc apparatus maintains the operation S250. On the other hand, if it is determined that the optical disc apparatus is out of the vertical deviation section, the optical disc apparatus returns to the operation S260.

In this manner, it is possible to pick up the data of the optical disc with regard to the periodic vertical deviation.

An abnormal situation of disturbing pickup of data on the recording surface of the optical disc may be partial vertical deviation. The partial vertical deviation is different from the foregoing defect or periodic vertical deviation, and it will be described in greater detail below.

Figure 13:
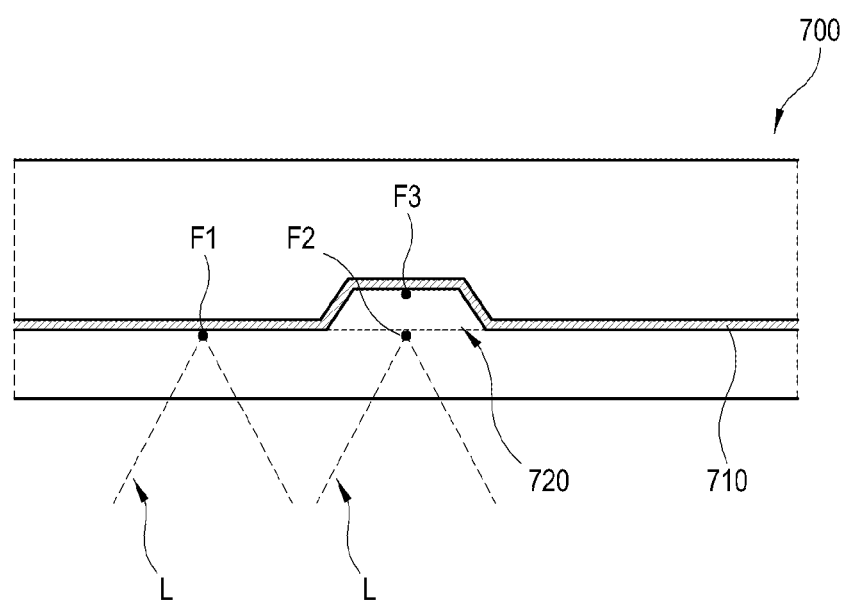
FIG. 13 is a diagram illustrating an example partial vertical deviation formed on the recording surface of the optical disc.

FIG. 13 is a diagram illustrating an example of a partial vertical deviation area 720 formed on a recording surface 710 of an optical disc 700.

As illustrated in FIG. 13, the optical disc 700 has a recording surface 710 in which data has already been recorded or data is newly recordable. The optical disc apparatus emits the laser L to the recording surface 710 of the rotating optical disc 700, and picks up the reflected light. The optical disc apparatus focuses the optical spot F1 of the laser L on the recording surface 710 so as to acquire data of the recording surface 710. If the optical spot F1 is not focused on the recording surface 710, it is impossible to normally pick up the data of the recording surface 710. For this reason, the servo control includes the focus servo control. The optical disc apparatus performs the focus servo control for mechanical operations so that the optical spot F1 can be focused on the recording surface 710.

However, the recording surface 710 may have an aperiodic partial uneven area. Such an uneven area may, for example, be recessed on or protruding from the recording surface 710, but data is recorded therein, which may be referred to as the partial vertical deviation area 720.

Unlike the periodic vertical deviation, the partial vertical deviation area 720 is an abnormal situation that is difficult to estimate in advance since it is an aperiodic and unspecified area on the recording surface 710. Further, the partial vertical deviation area 720 is different in focusing height of the optical spot F3 from the other areas of the recording surface 710, but is capable of reflecting light. Data can be recorded in the partial vertical deviation area 720. Accordingly, the partial vertical deviation is different from the defect where the light reflection is not performed.

For example, if an optical spot F2 is focused on the same height as the optical spot F1 for the other areas of the recording surface 710, it is difficult to pick up data from the partial vertical deviation area 720. It is possible to exactly pick up data from the partial vertical deviation area 720 through an optical spot F3 focused in different height from the optical spot F2.

Due to this difference between the partial vertical deviation and the defect, the partial vertical deviation area 720 is detected differently from the detection method for the defect. As described in the first example embodiment, the detection of the defect or the determination of the defect section is performed by checking whether the defect signal 440 (see FIG. 8) derived from the RF signal 420 (see FIG. 8) is high or not. Unlike the defect area, the partial vertical deviation area 720 is not shown as the defect signal since the optical spot F3 is just different in height from the optical spot F2 of the other recording surface.

Further, the partial vertical deviation has to be differently processed since it is caused differently from the defect. If the partial vertical deviation is processed by the method of generating the holding signal and performing the servo control like that of the defect, it is not solved since instant variance in focusing the optical spots F1 and F2 is disturbed.

The meaning of the instant variance in focusing the optical spots F1 and F2 is as follows. Fundamentally, the servo control is feedback control to make a focus error and a tracking error become zero based on the servo control signal including the focus error signal and the tracking error signal. Although the recording surface 710 of the optical disc 700 is not flat, the pick-up module (not shown) for emitting the laser L within a certain allowable range can instantly vary to focus the optical spots F1 and F2 along the recording surface 710. However, this allowable range is limited by the performance of the actuator (not shown) for adjusting the rotation speed of the optical disc 700 and the position of the pick-up module (not shown).

If the hold signal is applied to the partial vertical deviation area 720, possibility of the actuator (not shown) to cope with the partial vertical deviation area 720 is stopped since the servo control of the actuator (not shown) is fixed to the gain and phase of the previous stage. Accordingly, the partial vertical deviation has to be differently coped with from the defect.

To pick up the data corresponding to the partial vertical deviation area 720 of the recording surface 710, two methods may be used as follows. One is a method of detecting the partial vertical deviation area 720 from the recording surface 710, and the other is a method of picking up data from the detected partial vertical deviation area 720.

Figure 14:
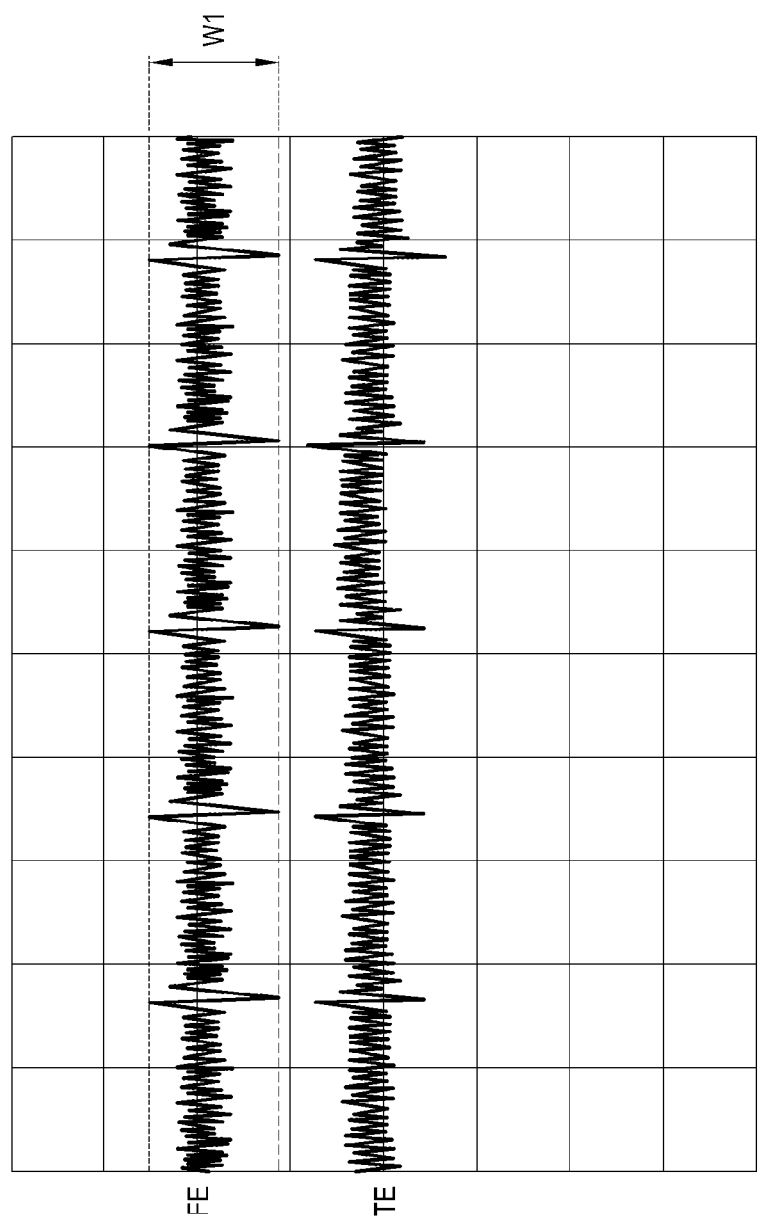
FIG. 14 is a diagram illustrating example waveforms of a focus error signal and a tracking error signal generated in the optical disc apparatus.

FIG. 14 is a waveform diagram illustrating an example of a focus error signal FE and a tracking error signal TE generated in the optical disc apparatus.

As illustrated in FIG. 14, the optical disc apparatus emits the laser to the rotating optical disc, and picks up the reflected light, thereby generating a recording reproducing, e.g., an RF signal. Further, the optical disc apparatus generates the focus error signal FE that exhibits a position error in a vertical direction of focusing the laser on the recording surface of the optical disc, and the tracking error signal TE that exhibits a position error in a horizontal direction of focusing the laser on the recording surface of the optical disc, from the RF signal.

Since this example embodiment is provided to cope with the partial vertical deviation, e.g., is related to focusing the light beam, the optical disc apparatus takes only the focus error signal FE into account among two servo control signals. Alternatively, the optical disc apparatus may take the focus driving signal (not shown), which has a waveform similar to that of the focus error signal FE, into account.

In FIG. 14, the focus error signal FE oscillates approximately small with respect to 0 as time goes by but may have an area where it oscillates largely by a width of, for example, W1. In the area having small oscillating waveforms, it is regarded that a focus error is not great and the optical spot is properly focused on the recording surface of the optical disc.

On the other hand, in the area where the waveforms have a width of W1 greater than a preset value, it is regarded that the focus error is great and the optical spot is not properly focused on the recording surface of the optical disc. Therefore, the optical disc apparatus determines an area or section has a partial vertical deviation if the waveform of the focus error signal FE has the width equal to or greater than the preset value in this area or section.

To more correctly determine the partial vertical deviation, the optical disc apparatus may additionally take the defect signal 440 (see FIG. 8) into account. If the defect signal is high in a certain section, it is determined that this section has the defect. On the other hand, if the defect signal is low, it is determined that this section has no defect. However, if the focus error signal FE shows an abnormal width in the section having no defect, it means that there is an abnormal situation of disturbing pickup of data besides the defect. Accordingly, if the amplitude of the focus error signal FE is equal to or higher than the setting value and the defect signal is low in a certain section, the optical disc apparatus determines that this section has a partial vertical deviation.

An example method of determining the partial vertical deviation is as follows. The optical disc apparatus generates the focus error signal for the focus servo control based on the light reflected from the optical disc, and determines a section, in which the amplitude of the focus error signal is equal to or higher than a preset value, as the partial vertical deviation section. Further, the optical disc apparatus determines a section, in which the amplitude of the focus error signal is equal to or higher than a preset value and the defect signal is low, as the partial vertical deviation section. Both the former and the latter are usable in determining the partial vertical deviation section, but the latter is more precise.

In order to exactly pick up the data in the determined partial vertical deviation section or partial vertical deviation area, the performance of the focus servo control may be improved to increase the focus moving speed of the optical spot.

As a method of increasing the focus moving speed of the optical spot, there is a method of increasing operation sensitivity of the focus actuator for vertically operating the pick-up module to perform focus control of the light beam. The focus actuator is similar to that described above.

Operation sensitivity of the focus actuator will be described in greater detail below.

Figure 15:
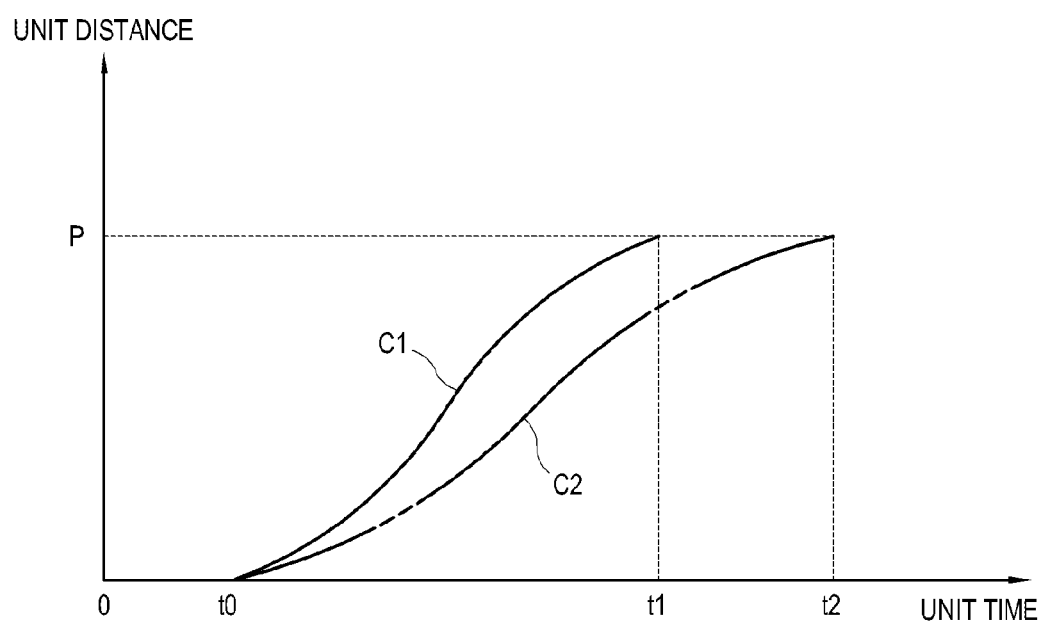
FIG. 15 is a graph illustrating an example comparison in time taken to reach a target position according to operation sensitivities of a focus actuator.

FIG. 15 is a graph illustrating an example of comparison in time taken to reach a target position according to operation sensitivities of the focus actuator.

FIG. 15 illustrates a curve C1 where the focus actuator operates in first sensitivity and a curve C2 where the focus actuator operates in the second sensitivity, on coordinates of unit time and unit distance. The first sensitivity is higher than the second sensitivity.

When the focus actuator moves to a position spaced apart at a distance P from a predetermined position, the focus actuator receives a focus control signal at a point of time t0, the focus actuator reaches the corresponding position by the first sensitivity at a point of time t1, and the focus actuator reaches the corresponding position by the second sensitivity at a point of time t2.

In this example, time of t1−t0 is taken when the focus actuator operates by the first sensitivity, and time of t2−t0 is taken when the focus actuator operates by the second sensitivity. Since t1<t2, (t1−t0)<(t2−t0). Thus, the curve C1 has a higher gradient than the curve C2.

For example, when the focus actuator operates by the relatively high first sensitivity, responsivity to the focus control signal increases and it is thus possible to move to a desired position within a relatively short time. In the partial vertical deviation section, if the operation sensitivity of the focus actuator is increased to be higher than the preset value, time to be taken in moving the focus of the optical spot by the focus actuator is shortened. Thus, the optical disc apparatus can more precisely, e.g., exactly, pick up data from the partial vertical deviation section. The operation sensitivity of the focus actuator may, for example, be controlled by a control signal transmitted from the controller of the optical disc apparatus to the focus actuator.

Although the focus actuator is designed and manufactured to operate by the first sensitivity, the optical disc apparatus operates the focus actuator by the second sensitivity, which is lower by a preset level than the maximum performance, in the normal servo control. For example, if the operation sensitivity of the focus actuator has the maximum level of '100', the optical disc apparatus operates the focus actuator by an operation sensitivity lower than '100', e.g. by an operation sensitivity of '70' to '80', in the normal servo control.

If the focus actuator is operated by the operation sensitivity of '100' in the normal servo control, the focus actuator excessively responds to the control signal and thus the optical spot may be focused at an abnormal position. Further, if the focus actuator is operated by excessive responsivity, it may shorten the lifespan of the focus actuator.

For this reason, the optical disc apparatus operates the focus actuator by an operation sensitivity of '70' to '80' in the normal servo control, and operates the focus actuator by a higher operation sensitivity of '90' in the partial vertical deviation area, thereby securing the pickup of the data with more improved responsivity.

Figure 16:
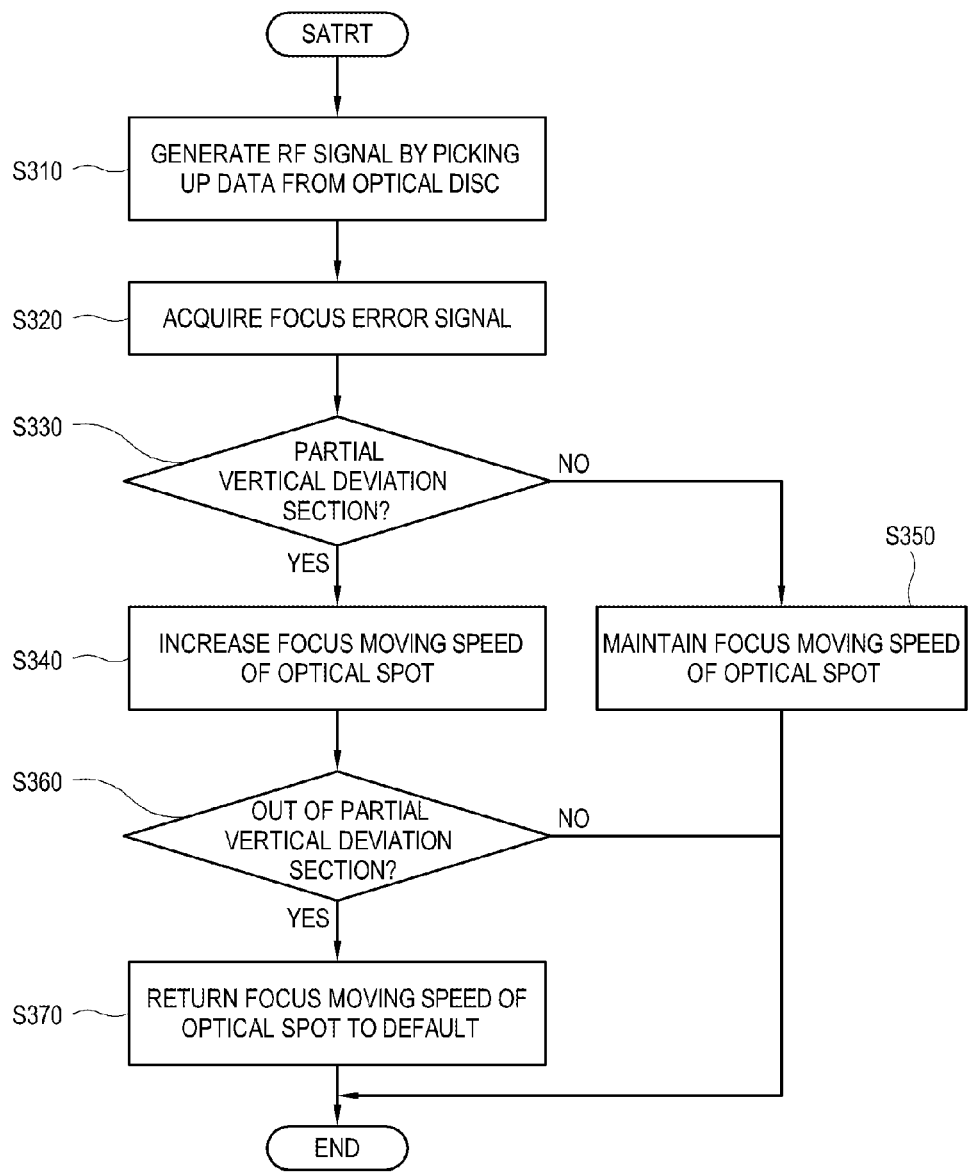
FIG. 16 is a flowchart illustrating an example control method of an optical disc apparatus.

FIG. 16 is a flowchart illustrating an example control method of an optical disc apparatus according to a third example embodiment. The basic structure of the optical disc apparatus according to an example embodiment is similar to those described in the foregoing example embodiments.

As illustrated in FIG. 16, at operation S310 the optical disc apparatus picks up data of an optical disc and generates an RF signal.

At operation S320 the optical disc apparatus acquires a focus error signal for the focus servo control.

At operation S330 the optical disc apparatus determines whether there is a partial vertical deviation section based on the focus error signal. The partial vertical deviation section is determined, for example, as a section having an amplitude equal to or higher than a preset level in the focus error signal.

If it is determined that there is the partial vertical deviation section, at operation S340 the optical disc apparatus increases the focus moving speed of the optical spot formed by the pick-up module. The focus moving speed of the optical spot may be increased by improving the operation sensitivity of the focus actuator that performs the focus control for the pick-up module.

On the other hand, if it is determined that there is no partial vertical deviation section, at operation S350 the optical disc apparatus maintains the focus moving speed of the optical spot as it is. For example, the optical disc apparatus maintains the default operation sensitivity of the focus actuator.

At operation S360 the optical disc apparatus determines whether the optical spot is out of the partial vertical deviation section. Alternatively, the optical disc apparatus may determine whether a preset time elapses from the start of coping with the partial vertical deviation section.

If the optical spot is out of the partial vertical deviation section or if a preset time elapses from the start of coping with the partial vertical deviation section, at operation S370 the optical disc apparatus returns the focus moving speed of the optical spot to an original speed. For example, the optical disc apparatus returns the operation sensitivity of the focus actuator to a default value.

If the optical spot is not out of the partial vertical deviation section or a preset time does not elapse from the start of coping with the partial vertical deviation section, the optical disc apparatus maintains the operation based on the value adjusted in the operation S340.

Figure 17:
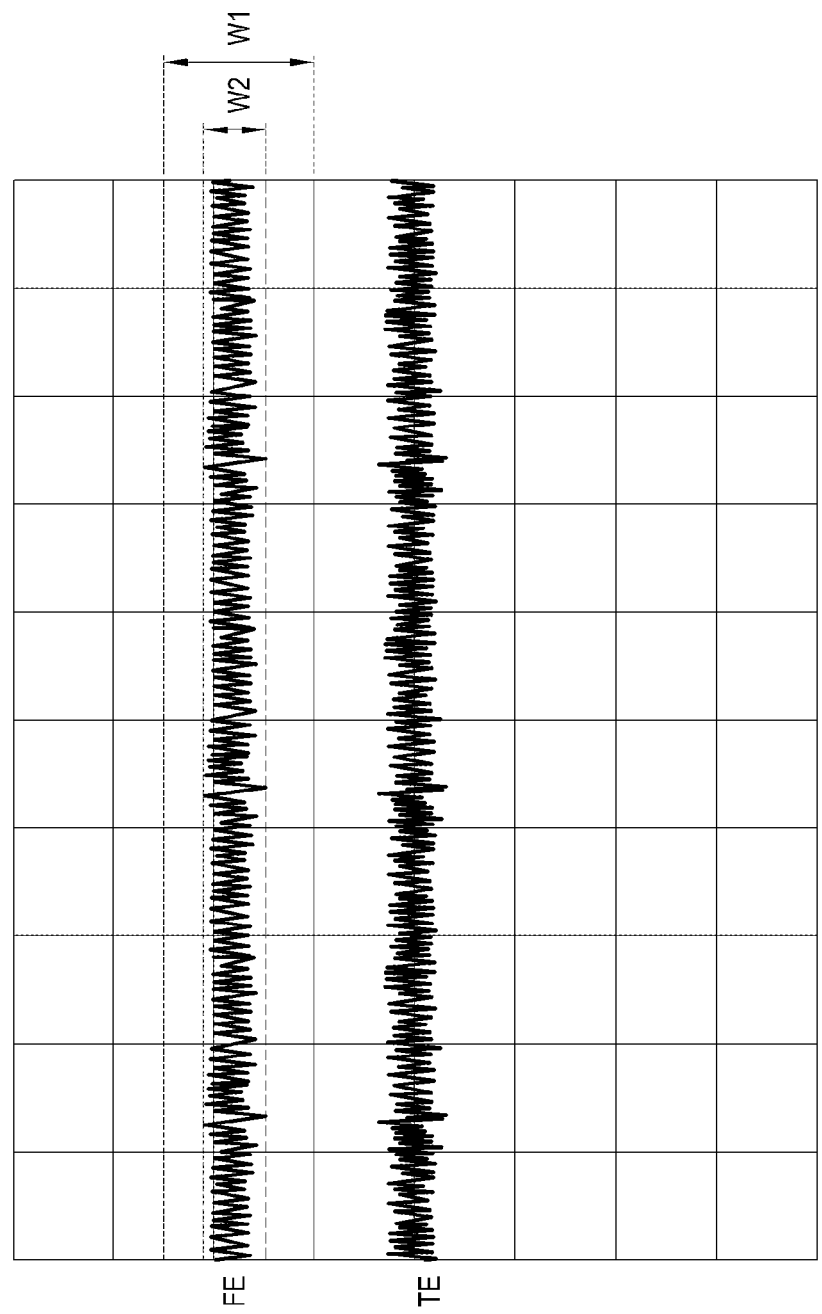
FIG. 17 is a diagram illustrating an example change in waveforms of a focus error signal and a tracking error signal generated in the optical disc apparatus.

FIG. 17 is a waveform diagram illustrating an example change in waveforms of a focus error signal FE and a tracking error signal TE generated in the optical disc apparatus according to the third example embodiment. In other words, FIG. 17 illustrates change in the servo control signal measured after the third example embodiment is applied to the state of FIG. 14.

As illustrated in FIG. 17, the optical disc apparatus according to this example embodiment generates the focus error signal FE, which exhibits a vertical position error in focusing the laser formed on the recording surface of the optical disc, and the tracking error signal TE, which exhibits a horizontal position error in focusing the laser formed on the recording surface of the optical disc, from the RF signal.

According to comparison between the focus error signal FE of FIG. 17 and that of FIG. 14, the maximum variance in the amplitude of the focus error signal FE is W2, which is smaller than W1. For example, according to this example embodiment, the focus servo control is generally improved in stability, and the optical spot is properly focused on the recording surface of the optical disc.

Thus, according to an example embodiment, it is possible to cope with the partial vertical deviation section, thereby improving accuracy in pickup of data.

In the foregoing example embodiments, the focus moving speed of the optical spot is increased by increasing the operation sensitivity of the focus actuator in order to accurately pick up data in the partial vertical deviation section. In other words, the method of increasing the tracking speed of the pick-up module on the recording surface was described. However, the method of accurately picking up data in the partial vertical deviation section is not limited to the foregoing example embodiments.

To accurately pick up data on the recording surface of the optical disc in the optical disc apparatus, the pick-up module has to track the recording surface at desired timing. To this end, the tracking speed of the pick-up module may be increased. The rotation speed of the optical disc may be decreased instead of increasing the tracking speed of the pick-up module. If the rotation speed of the optical disc is reduced, it is less difficult for the pick-up module to track the recording surface.

A fourth example embodiment will be described in greater detail below with reference to FIG. 18.

Figure 18:
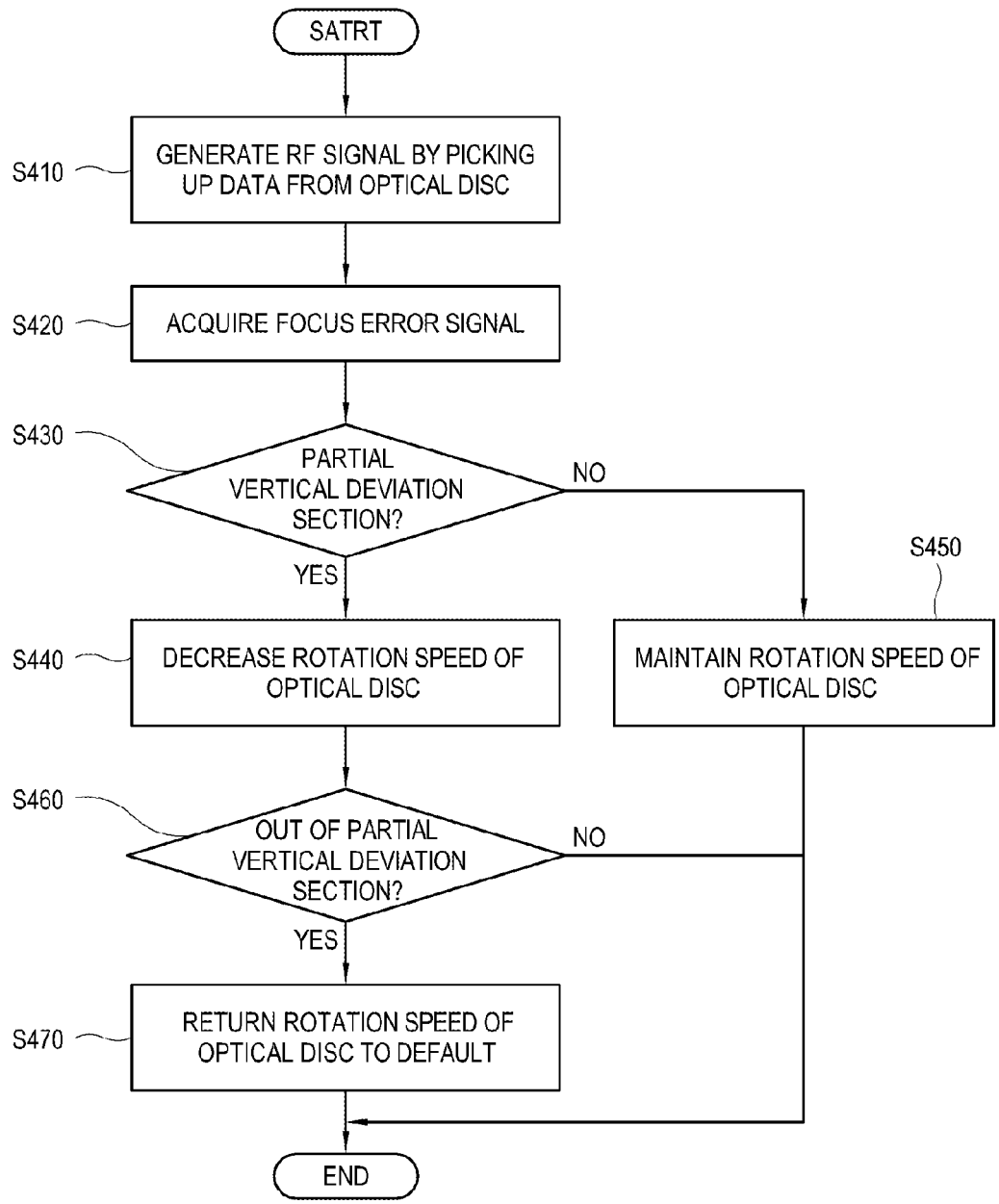
FIG. 18 is a flowchart illustrating an example control method of an optical disc apparatus.

FIG. 18 is a flowchart illustrating an example control method of an optical disc apparatus according to a fourth example embodiment.

As illustrated in FIG. 18, at operation S410 the optical disc apparatus picks up data from the optical disc and generates an RF signal.

At operation S420 the optical disc apparatus acquires a focus error signal for the focus servo control.

At operation S430 the optical disc apparatus determines whether there is a partial vertical deviation section based on the focus error signal.

If it is determined that there is the partial vertical deviation section, at operation S440 the optical disc apparatus decreases the rotation speed of the optical disc. For example, the optical disc apparatus lowers a RPM of the spindle motor for rotating the optical disc to a preset level. Thus, the pick-up module can focus the optical spot at a desired position even in the partial vertical deviation section.

On the other hand, if it is determined that there is no partial vertical deviation section, at operation S450 the optical disc apparatus maintains the operation speed of the optical disc. For example, the optical disc apparatus maintains the RPM of the spindle motor to a default value.

At operation S460 the optical disc apparatus determines whether the optical spot is out of the partial vertical deviation section. Alternatively, the optical disc apparatus may determine whether a preset time elapses from the start of coping with the partial vertical deviation section.

If the optical spot is out of the partial vertical deviation section or if a preset time elapses from the start of coping with the partial vertical deviation section, at operation S470 the optical disc apparatus returns the rotation speed of the optical disc to an original speed. For example, the optical disc apparatus returns the rotation speed of the optical disc to an original speed. For example, the optical disc apparatus returns the RPM of the spindle motor to a default value.

If the optical spot is not out of the partial vertical deviation section or a preset time does not elapse from the start of coping with the partial vertical deviation section, the optical disc apparatus maintains the operation based on the value adjusted in the operation S440.

As described above, according to the third and fourth example embodiments, the optical disc apparatus allows the focus of the light beam to track the curvature of the recording surface of the optical disc within a preset allowable range, and processes the light beam reflected from the recording surface. For example, the optical disc apparatus determines whether the focus of the light beam cannot track the curvature of the recording surface, e.g., whether the partial vertical deviation exists in a certain section of the recording surface. The optical disc apparatus may increase the allowable range by increasing the operation speed of the pick-up module with respect to the rotation speed of the optical disc so that the focus of the light beam can track the curvature of the recording surface in this section determined as above.

As a method of increasing the operation speed of the pick-up module with respect to the rotation speed of the optical disc, there are a method of decreasing the rotation speed of the optical disc and a method of increasing the operation speed of the pick-up module.

The focus error signal may be used to determine whether the focus of the light beam cannot track the curvature of the recording surface in a certain section. If the amplitude of the focus error signal is greater than a preset value in a certain section, it is determined that the focus of the light beam cannot track the curvature of the recording surface in this section.

The methods according to the foregoing example embodiments may be achieved in the form of a program command that can be implemented in various computers, and recorded in a computer readable medium. Such a computer readable medium may include a program command, a data file, a data structure or the like, or combination thereof. For example, the computer readable medium may be stored in a voltage or nonvolatile storage such as a read only memory (ROM) or the like, regardless of whether it is deletable or rewritable, for example, a RAM, a memory chip, a device or integrated circuit (IC) like memory, or an optically or magnetically recordable or machine (e.g., a computer)-readable storage medium, for example, a compact disk (CD), a digital versatile disk (DVD), a magnetic disk, a magnetic tape or the like. It will be appreciated that a memory, which can be included in a mobile terminal, is an example of the machine-readable storage medium suitable for storing a program having instructions for materializing the exemplary embodiments. The program command recorded in this storage medium may be specially designed and configured according to the example embodiments, or may be publicly known and available to those skilled in the art of computer software.

Although various example embodiments have been illustrated and described, it will be appreciated by those skilled in the art that changes may be made in these example embodiments without departing from the principles and spirit of the disclosure, the scope of which is defined in the appended claims and their equivalents.

What is claimed is:

1. An optical disc apparatus comprising:
    a driver configured to rotate an optical disc having a recording surface for data;
    an optical pick-up configured to emit a light beam to the optical disc rotated by the driver; and
    at least one processor configured to operate the pick-up to focus the light beam emitted from the optical pick-up to perform one of recording and reproducing the data on the recording surface and track curvature of the recording surface within a preset allowable range, and to process the light beam reflected from the recording surface,
    the at least one the processor further configured to increase the allowable range if it is determined that the focus of the light beam cannot track the curvature of the recording surface in a section of the recording surface.

2. The optical disc apparatus according to claim 1, wherein the at least one processor is configured to control the optical pick-up to be adjusted in position with respect to an optical axis of the light beam in response to a focus error signal that indicates an extent of deviation of the light beam from focus on the recording surface, and to determine that the focus of the light beam cannot track the curvature of the recording surface in the section if the focus error signal has an amplitude equal to or greater than a preset value.

3. The optical disc apparatus according to claim 2, wherein the optical pick-up is configured to derive a reproducing signal including a data recording pattern formed along a track of the recording surface based on the light beam reflected from the recording surface, and the at least one the processor is configured to determine that the focus of the light beam cannot track the curvature of the recording surface in the section if the focus error signal has an amplitude equal to or greater than the preset value and the reproducing signal of the data recording pattern based on the reflected light beam.

4. The optical disc apparatus according to claim 1, wherein the at least one processor is configured to increase the allowable range by increasing an operation speed of the optical pick-up with respect to a rotation speed of the optical disc.

5. The optical disc apparatus according to claim 4, wherein the driver includes a shaft configured to support the optical disc and a spindle motor for driving the shaft, and the at least one processor is configured to increase the operation speed of the optical pick-up with respect to the rotation speed of the optical disc by decreasing revolutions per unit time of the spindle motor.

6. The optical disc apparatus according to claim 4, wherein the at least one processor is configured to increase the operation speed of the optical pick-up with respect to the rotation speed of the optical disc by increasing a focus moving speed of the light beam.

7. The optical disc apparatus according to claim 6, wherein the optical pick-up comprises an actuator configured to adjust a focus height of the light beam by adjusting a position of the optical pick-up along an optical axis of the light beam, and the at least one processor is configured to increase the focus moving speed of the light beam by increasing operation sensitivity of the actuator.

8. The optical disc apparatus according to claim 7, wherein the actuator is configured to increase a speed of moving the optical pick-up as the operation sensitivity increases.

9. The optical disc apparatus according to claim 7, wherein the optical pick-up comprises a light source configured to generate the light beam, and at least one lens configured to compensate the light beam for aberration, and the actuator is configured to move the at least one lens.

10. A method of controlling an optical disc apparatus, the method comprising:

rotating an optical disc having a recording surface for data;

emitting a light beam by an optical pick-up to the rotating optical disc; and operating the optical pick-up to focus the light beam emitted from the optical pick-up to perform one of recording and reproducing the data on the recording surface and to track curvature of the recording surface within a preset allowable range, and processing the light beam reflected from the recording surface, the processing the light beam comprising increasing the allowable range if it is determined that the focus of the light beam cannot track the curvature of the recording surface in a section of the recording surface.

11. The method according to claim 10, wherein the processing the light beam comprises:

controlling the optical pick-up to adjust a position with respect to an optical axis of the light beam in response to a focus error signal that indicates an extent of deviation of the light beam from focus on the recording surface; and determining that the focus of the light beam cannot track the curvature of the recording surface in the section if the focus error signal has an amplitude equal to or greater than a preset value.

12. The method according to claim 11, wherein the processing the light beam comprises:

deriving a reproducing signal including a data recording pattern formed along a track of the recording surface based on the light beam reflected from the recording surface; and determining that the focus of the light beam cannot track the curvature of the recording surface in the section if the focus error signal has an amplitude equal to or greater than the preset value and the reproducing signal shows the data recording pattern based on the reflected light beam.

13. The method according to claim 10, wherein the increasing the allowable range comprises increasing the allowable range by increasing an operation speed of the optical pick-up with respect to a rotation speed of the optical disc.

14. The method according to claim 13, wherein the optical disc apparatus comprises a shaft configured to support the optical disc and a spindle motor for driving the shaft, and the increasing the operation speed of the optical pick-up with respect to the rotation speed of the optical disc comprises decreasing revolutions per unit time of the spindle motor.

15. The method according to claim 13, wherein the increasing the operation speed of the optical pick-up with respect to the rotation speed of the optical disc comprises increasing a focus moving speed of the light beam.

16. The method according to claim 15, wherein the optical disc apparatus comprises an actuator configured to adjust a focus height of the light beam by adjusting a position of the optical pick-up along an optical axis of the light beam, and the increasing the focus moving speed of the light beam comprises increasing operation sensitivity of the actuator.

* * * * *